(12) United States Patent
Iossel et al.

(10) Patent No.: US 6,242,688 B1
(45) Date of Patent: Jun. 5, 2001

(54) SEA ELECTRODE FOR A HIGH VOLTAGE DIRECT CURRENT TRANSMISSION SYSTEM

(75) Inventors: Yuri Iossel, Helsinki; Grigory Kazarov; Veijo Koski, both of Espoo; Alexey Poliakov, Helsinki; Heiko Gebhardt, Keispelt, all of (FI)

(73) Assignee: Asea Brown Boveri AB, Vasteras (SE)

( * ) Notice: Subject to any disclaimer, the term of this patent is extended or adjusted under 35 U.S.C. 154(b) by 0 days.

(21) Appl. No.: 09/297,198
(22) PCT Filed: Aug. 7, 1997
(86) PCT No.: PCT/SE97/01329
§ 371 Date: Jun. 21, 1999
§ 102(e) Date: Jun. 21, 1999
(87) PCT Pub. No.: WO98/19363
PCT Pub. Date: May 7, 1998

(30) Foreign Application Priority Data

Oct. 28, 1996 (RU) ................................. 96121598

(51) Int. Cl.[7] .................................................. H01R 4/66
(52) U.S. Cl. ........................... 174/6; 174/68.1; 174/101.5
(58) Field of Search ................................. 174/6, 7, 68.1, 174/68.3, 70 R, 70 S, 101.5, 135, 138 R

(56) References Cited

U.S. PATENT DOCUMENTS

| 4,728,177 | * | 3/1988 | Green | ..................................... | 350/357 |
| 5,120,904 | | 6/1992 | Ullman et al. | ........................ | 174/68.1 |
| 5,910,236 | * | 6/1999 | Iossel et al. | .......................... | 204/280 |

FOREIGN PATENT DOCUMENTS

| 458498 | 8/1968 | (CH) . |
| 29515163 | 11/1995 | (DE) . |
| 1280382 | 11/1961 | (FR) . |
| WO 93/02311 | 2/1993 | (WO) . |
| WO 97/14196 | 4/1997 | (WO) . |
| WO 98/19362 | * 5/1998 | (WO) . |

OTHER PUBLICATIONS

Lin, H. et al., "Earth resistivity measurements and current density calculation for toroidal HVDC ground electrodes", IEEE/CSEEE Joint Conference on High–Voltage Transmission Systems In China, Beijing, China, Oct. 17–22, 1987, pp. 514–518.

Moore, R.J. et al., IEEE, 1996, "Cahorahassa–Apollo HVDC Linl", pp. 699–704.

Hannestad, J.W., "Electrode Design", pp. 1–47, EPRI–EL–2020, 1981.

Uhlmann, Erich, "Power Transmission By Direct Current", Springer–Verlag, 1975, pp. 255–273.

* cited by examiner

Primary Examiner—Dean A. Reichard
Assistant Examiner—Charlie Nguyen
(74) Attorney, Agent, or Firm—Connolly Bove Lodge & Hutz, LLP

(57) ABSTRACT

A sea electrode (15) for grounding of a high voltage direct current transmission system comprises an electrically conducting electrode body (1) for connection to the transmission system and at least one ballast (4) located above the electrode. The electrode further comprises a layer (5) of an electrically non-conducting material, located above the electrode body and extending over it, so as to influence the maximum electrical field strength not to exceed a desired level at a point (P) at the edge of the non-conducting layer and thereby also in the sea water outside a zone (35) located below the non-conducting layer and in a vertical direction limited by the edge of the non-conducting layer.

20 Claims, 22 Drawing Sheets

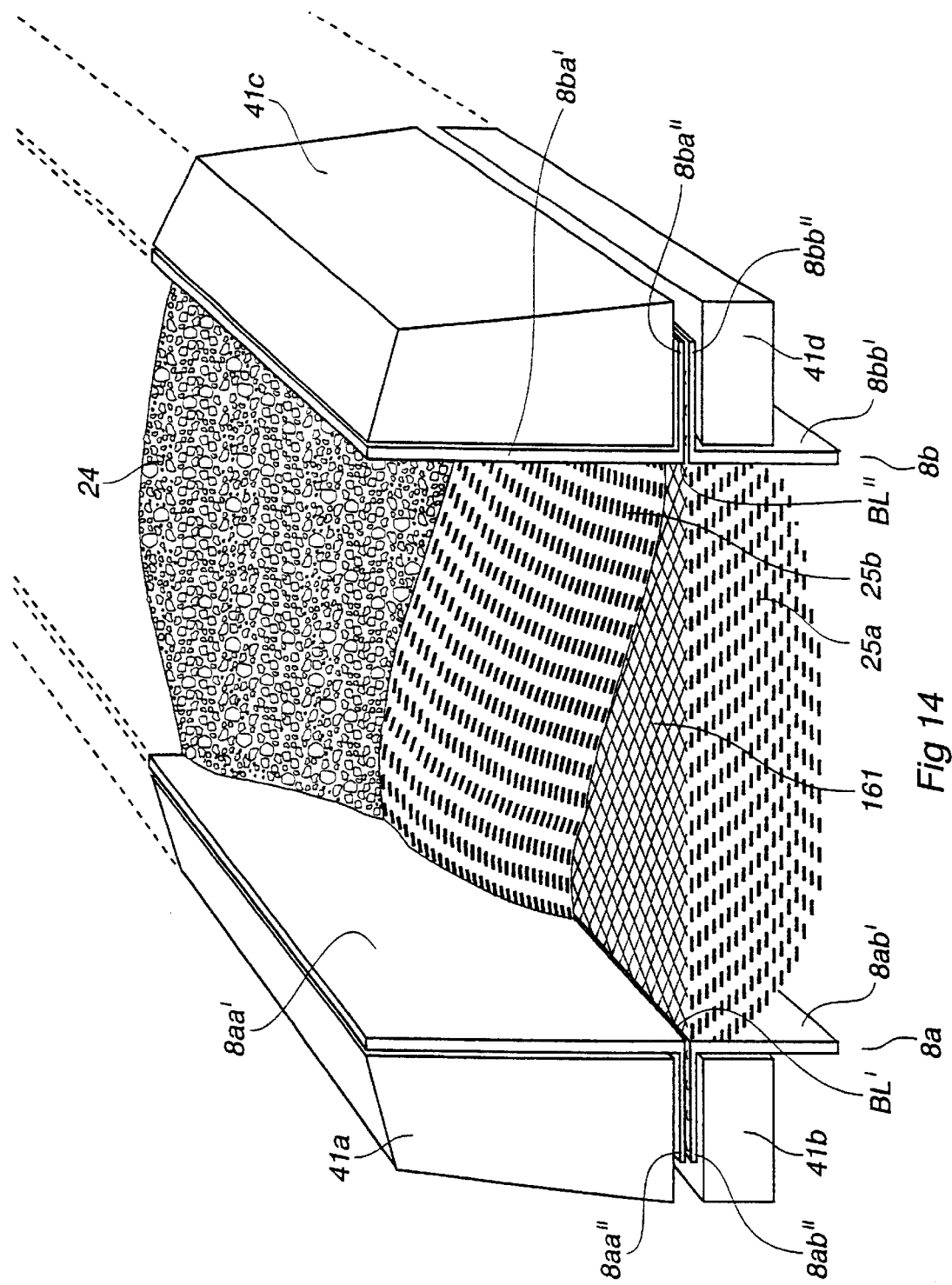

SEA ELECTRODE FOR A HIGH VOLTAGE DIRECT CURRENT TRANSMISSION SYSTEM

TECHNICAL FIELD

The invention relates to a sea electrode for grounding of a high voltage direct current (HVDC) transmission system.

BACKGROUND ART, DISCUSSION OF THE PROBLEM

Ground electrodes means in this context devices used to connect an electrode line of a power network comprising an HVDC transmission system, via one or more feeder cables, to a conducting medium such a soil or sea water.

HVDC transmission systems usually have DC voltages above 5 kV and a transmitted power above 10 MW.

As compared with alternating current (AC) transmission systems, HVDC transmission systems require only two conductors. At least one of those conductors is executed as an overhead line or a high voltage cable. For bipolar transmission another conductor of the same kind is used under normal operating conditions, but in monopolar transmission, the ground, that is soil and/or sea water, is used as return conductor for the transmitted DC-current. However, ground electrodes are required also in HVDC transmission systems intended for bipolar transmission to transfer unbalance currents and, under operation in monopolar mode, the whole DC current transmitted by the HVDC system.

Depending on the location of the HVDC-system, the ground electrodes can be located in soil or in sea water. Ground electrodes located in sea water usually have certain advantages as compared to ground electrodes located in soil, such as a better personal safety because they are usually not easily accessible to human beings, and their environment offers a good cooling system and a surrounding conducting medium which has a higher specific conductivity than soil located far from the sea.

This application is concerned with sea electrodes, that is electrodes located in sea water and/or in sea water impregnated matter at the sea bottom, such as gravel, sand, clay and mud.

The sea electrode shall transfer the DC current from an electrode line of the HVDC system via one or more feeder cables to the sea water, which in this context is to be regarded as a good conducting homogeneous medium, and to the sea bottom, which has a lower specific conductivity than the water but usually, and in particular in layers close to the water, higher than for soil layers far away from the sea.

For a general description of ground electrodes in connection with HVDC systems, reference is made to for example E. Uhlmann: Power Transmission by Direct Current, Springer Verlag 1975, in particular pages 255–273.

The sea electrodes are—apart from the requirements as to current and resistance—also required to be electrically safe, to have high operational reliability and sufficiently long service life and in addition, they shall not cause any harmful environmental effects.

The grounding resistance has to be low, usually well below one ohm. In particular for sea electrodes an electric field strength in the sea water in the vicinity of the electrode, which will have a harmful influence on the environment and affect fish and possibly also other aqueous organisms in the vicinity of the electrode, shall be less than a desired level, often specified as 1 V/m.

A conventional sea electrode comprises an active part, herein called the electrode body, which is in electric contact with the sea water and with the sea bottom and through which the current is transferred, interconnection cables for internal connection of parts of the electrode body as described below, and additional parts performing purely mechanical functions, such as for instance electrode holders, supports and mechanical protection parts.

In order to reach a sufficiently low grounding resistance, a sea ground electrode usually comprises a large number of sub-electrodes, each sub-electrode being fed from a separate feeder cable, and comprising as active part at least one sub-electrode element. The surface of each sub-electrode element comprises an active part which is in electric contact with the sea water and/or sea water impregnated matter at the sea bottom. In cases where the sub-electrode comprises more than one such element, these elements are connected to each other by interconnection cables. The sub-electrodes are usually arranged in sections. Each such sub-electrode usually also comprises additional elements such as sub-electrode element holders.

Typically, the sub-electrode elements are manufactured in the form of rods, tubular elements, plates or meshes, which makes them easy to manufacture and to mount.

FIG. 1 illustrates schematically an electrical configuration typical for an HVDC transmission system with sea ground electrodes at both ends. An electric alternating current (AC) power network N1 is via a transformer T1 connected to the AC-side of a thyristor converter SR1 and an AC power network N2 is via a transformer T2 connected to the AC-side of a thyristor converter SR2. On the DC-sides of the converters, a cable LO connects one of their respective poles, and the ground return comprises two electrode lines LE1, LE2, two sea electrodes 15 of similar structure, and the sea water and the sea bottom (not shown) between the sea electrodes. The sea electrode at the converter SR1 comprises a plurality of sub-electrodes 16, each of which being connected to the electrode line via a main feeder cable 2. Each sub-electrode comprises a plurality of sub-electrode elements 161, 162, 163, interconnected by interconnection cables 2', 2", 2''' respectively, and mechanical support members (not shown). The electrode body comprises all the sub-electrode elements 161, 162, 163 comprised in all the sub-electrodes connected to the electrode line.

Ground electrodes for HVDC transmission systems, transferring comparatively high currents, operate, however, with a low average current density, and therefore often cover large areas at the sea bottom. However, an inhomogeneous current distribution with high local current densities on the surface of the electrode body, in particular at peripheral parts of the electrode and at feeding points of the sub-electrode elements, results in high local electric field strength in the sea water.

Usually, sea ground electrodes are protected and kept in place by a ballast, either in the form of a separate solid cover or by a layer of gravel.

FIG. 2A shows schematically an example of the physical layout, seen from above, of a prior art electrode for use as an anode, that is delivering current to the sea water. The sub-electrodes 16, each of which are fed by a separate feeder cable 2, are arranged in an array along a curved line, and are mutually separated from each other with substantially equal distances. However, the arrangement of sub-electrodes along a line as illustrated in FIG. 2A, can be executed also separated from each other with unequal distances.

FIG. 2B shows schematically another example of the physical layout, seen from above, of a prior art electrode for use as an anode. The sub-electrodes 16, each of which are fed by a separate feeder cable 2, are arranged in an array along a substantially straight line, and are mutually separated from each other with unequal distances, in such a way that the outermost located subelectrodes are located at a somewhat shorter distance from their neighboring sub-electrodes than are the sub-electrodes located in the center of the electrode.

FIG. 2C shows a known embodiment of a sub-electrode 16, with its active part, an sub-electrode element 161, executed as a flat, elongated mesh, made of a metal with a low dissolution rate, for instance coated titanium, and supported at its long sides by concrete slabs 41. Such a sub-electrode might also be provided with interconnection cables, connecting the feeder cables with different parts of it. Here, the whole surface of the sub-electrode element constitutes the active part of the surface.

FIG. 2D shows another known embodiment of a sub-electrode, comprising two cylinder-shaped sub-electrode elements 161, 162, connected in parallel by an interconnection cable 2' and fed from a common feeder cable 2. The sub-electrode elements are mounted in a box 42 of concrete for mechanical protection, the box being provided with pass ways (not indicated in the figure) for letting the sea water into contact with the sub-electrode elements.

The sub-electrode according to FIG. 2C can for instance be comprised in an electrode according to FIG. 2A and a sub-electrode according to FIG. 2D in an electrode according to FIG. 2B.

FIGS. 3A–3D show various prior art embodiments of sub-electrode elements.

FIG. 3A shows a sub-electrode element 161 of cylindrical shape, with the feeder cable 2 connected to the cross-section area at one of the ends. Here, the envelope surface S of the sub-electrode element constitutes the active part of the surface of the sub-electrode element, while the two cross-section areas S1, S2 (of which only S1 is shown) of it usually are covered by a non-conducting material and thus are not an active part of the surface of the sub-electrode element.

FIG. 3B shows a sub-electrode element 161 of flat shape, with the feeder cable 2 connected to the mid-point of the element and FIG. 3C shows a sub-electrode element 161 of flat mesh-type shape, with the feeder cable 2 connected to the mid-point of the element. Here, the whole surface of the sub-electrode element constitutes the active part of the surface.

FIG. 3D shows a sub-electrode element 161 in the shape of a bent cylinder, with two feeder cables 2a, 2b, for connection, one of them to each end of the element. The sub-electrode element has a radius R of curvature as from a center of curvature C. The active part S of the surface of the sub-electrode element is in this case the whole surface of it less the two cross-section surfaces S1, S2.

The sub-electrode elements according to FIGS. 3A and 3D can alternatively be of tubular form.

Sea electrodes in cathodic operation, that is where the current flows from the sea water into the electrode body, usually have an electrode body executed in the form of loops of wires or bars of copper.

Usually, it is more difficult to provide such electrodes with mechanical protection than it is with the electrodes intended for anodic operation, as described above, and typically they will also exhibit high current densities and consequently, high electric field strengths in the sea water in the vicinity of the electrode.

One disadvantage with the known sea electrodes is that they typically have a high local electric field strength, usually at the peripheral parts of their surface and at the locations where the feeder cables are connected. As already mentioned, the electric field strength may have a harmful effect on fish and possibly also other aqueous organisms in the vicinity of the electrode.

Another disadvantage with the known sea electrodes is that they usually are designed to operate with a low average current density on the surface of the electrode body in order to keep the maximum electric field strength at a desired value, typically in the order of 1 A/m$^2$. At least some materials, which can be used as anodes as well as cathodes, thus in contrary to the above-mentioned coated titanium, usable only in anodic operation, and copper, usable only in cathodic operation, typically allow for at least a hundred times higher current density. One consequence is that the electrodes are poorly utilized and another is that they often occupy large areas, and thus may influence local conditions in the sea, such as for instance water streams.

Still another disadvantage with the known sea electrodes is that the ballast executed as a layer of gravel can under certain circumstances, such as strong waves or anchoring of large ships, be destroyed, leaving the electrode unprotected or even damaged and difficult to repair. This is the reason why such electrode body materials as magnetite, graphite and silicon iron, which are mechanically brittle or fragile, have a very restricted use for sea electrodes.

SUMMARY OF THE INVENTION

The object of the invention is to provide a sea electrode of the kind stated in the introduction, which is improved with respect to the above-mentioned disadvantages connected with the prior art, in particular by reducing the electric field strength in the sea water in the vicinity of the electrode.

A sea electrode according to the invention comprises an electrically conducting electrode body for connection to the HVDC transmission system and at least one ballast located above the electrode, and is characterized in that the electrode further comprises a layer of electrically non-conducting material, located above the electrode body and extending over it, influencing the maximum electric field strength not to exceed a desired level at the edge of the non-conducting layer and thereby also in the sea water outside a zone located below the non-conducting layer and in a vertical direction limited by the edge of the non-conducting layer.

In an advantageous development of the invention, preferable where the electrode body comprises sub-electrode elements of an elongated form, the sea electrode further comprises at least two electrically non-conducting barriers, spaced apart along the sub-electrode element, and between which is formed an active part of the surface of the sub-electrode element, which active part is in electric contact with the sea water and/or sea water impregnated matter at the sea bottom, said barriers having a substantial extension outwards from the active part of the surface of the sub-electrode element into the sea water and/or sea water impregnated matter at the sea bottom, so as to homogenize the current distribution along the active part of the surface of the sub-electrode element. The barriers act as barriers to the current lines at the sub-electrode element, which current lines, in the vicinity of the surfaces of the barriers, will be directed along these surfaces, and the barriers will thereby homogenize the current distribution along the active part of the surface of the at least one sub-electrode element. A current line, as mentioned above, is to be understood as a line such that, at every point of it, the current density vector at that point is tangential to the line.

Further developments and improvements of the invention will become clear from the following description and claims.

BRIEF DESCRIPTION OF THE DRAWINGS

FIG. 6A shows schematically a side view of a sea electrode with a mesh-type sub-electrode element and a ballast, with a non-conducting layer according to the invention, FIG. 14 shows a sub-electrode element embedded in a backfill according to an advantageous development of the invention.

DESCRIPTION OF PREFERRED EMBODIMENTS

Figure 5A:
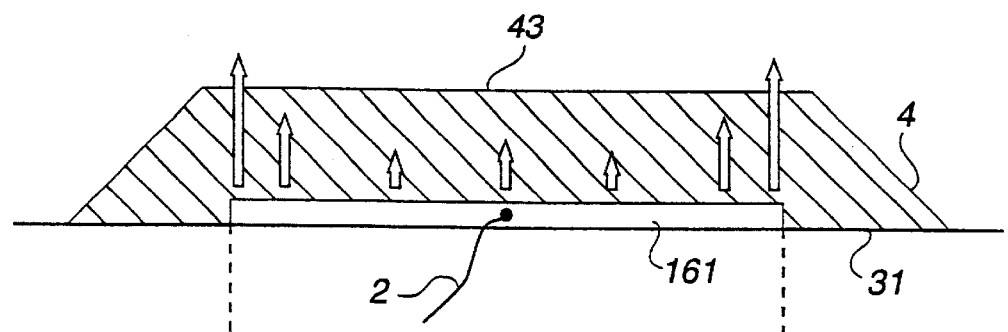
FIG. 5A shows schematically a side view of a prior art sea electrode with a mesh-type sub-electrode element and a ballast.

FIG. 5A shows schematically a cross section in a side view of a prior art sea electrode with a mesh-type sub-electrode element 161 as active part, and a ballast 4 in the form of a gravel layer. The sub-electrode element is located at the sea bottom 31, has the length 2L in the plane of the drawing and is fed at its midpoint, as illustrated in FIG. 3C, from a feeder cable 2.

The specific conductivity of the sea water and of the sea bottom are usually several orders of magnitude below the specific conductivity of the material of the electrode body.

It should be noted that the equivalent specific conductivity of a gravel layer above the electrode, although lower than the conductivity of the sea water, is high enough to allow for currents to penetrate the layer and reach the sea water. This is the case also for a massive ballast made of concrete, which becomes electrically conducting after being immersed into sea water for some time. Thus, in a configuration according to FIG. 5A, the electrode current will flow from the sub-electrode element also upwards to the sea surface.

The current density distribution on the electrode body depends on the current distribution between the sub-electrodes as well as on the current distribution within each sub-electrode.

It can be assumed that the current density and the electric field strength in the water and the sea bottom surrounding the electrode body are proportional to each other. Thus, also the localization of areas with high local electric field strength will depend on the current distribution between the sub-electrodes and within each of them.

The current distribution between the sub-electrodes depends mainly on their relative location to each other and on the distances between them and usually leads to that the currents are highest at the outermost located sub-electrode of the electrode.

The current distribution within the sub-electrode depends mainly on the shape of the sub-electrode elements and the locations of their feeding points.

The highest current density will occur at the peripheral parts of these outermost sub-electrodes.

Figure 1:
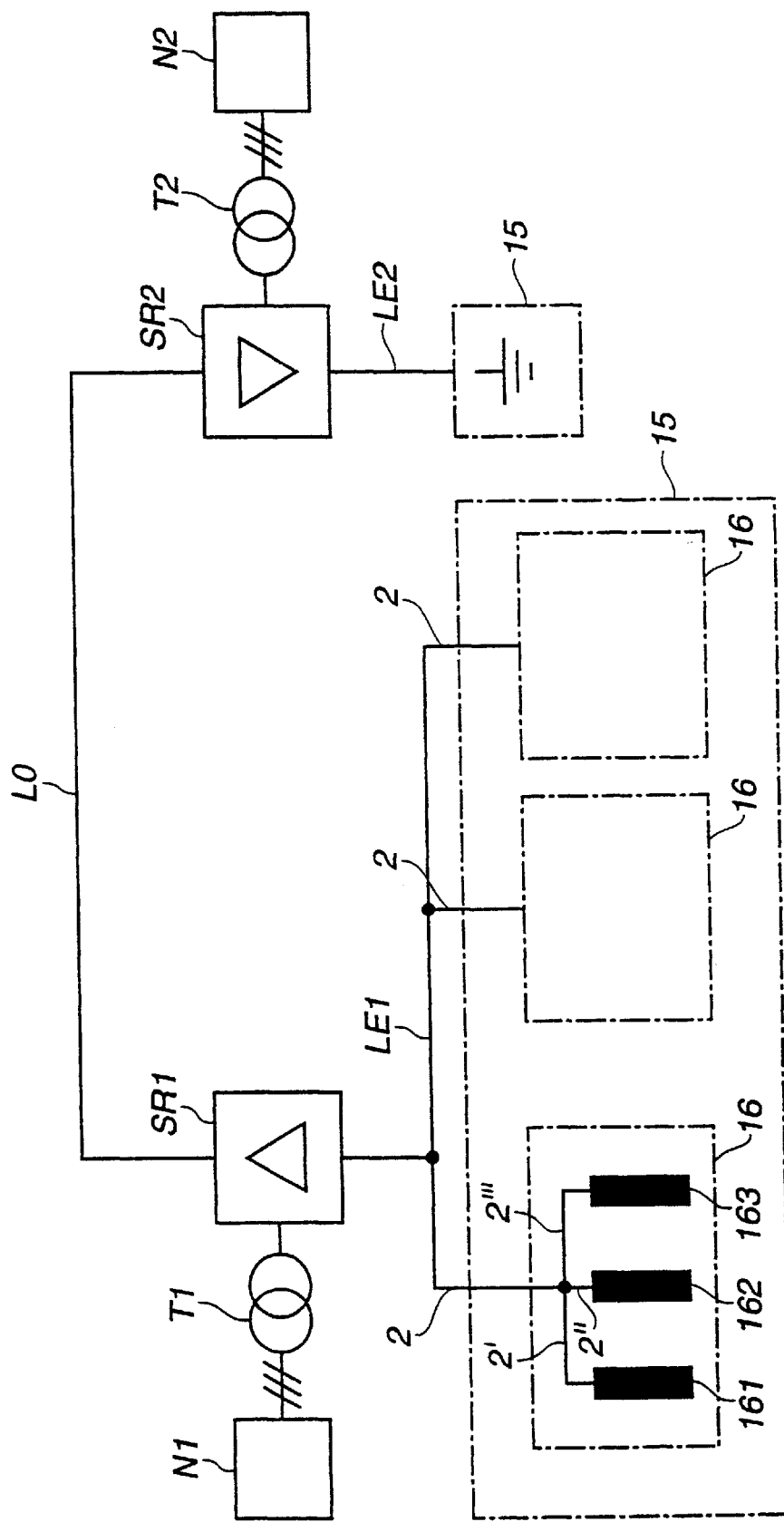
FIG. 1 shows schematically a typical electrical configuration for an HVDC transmission system.
Figure 2A:
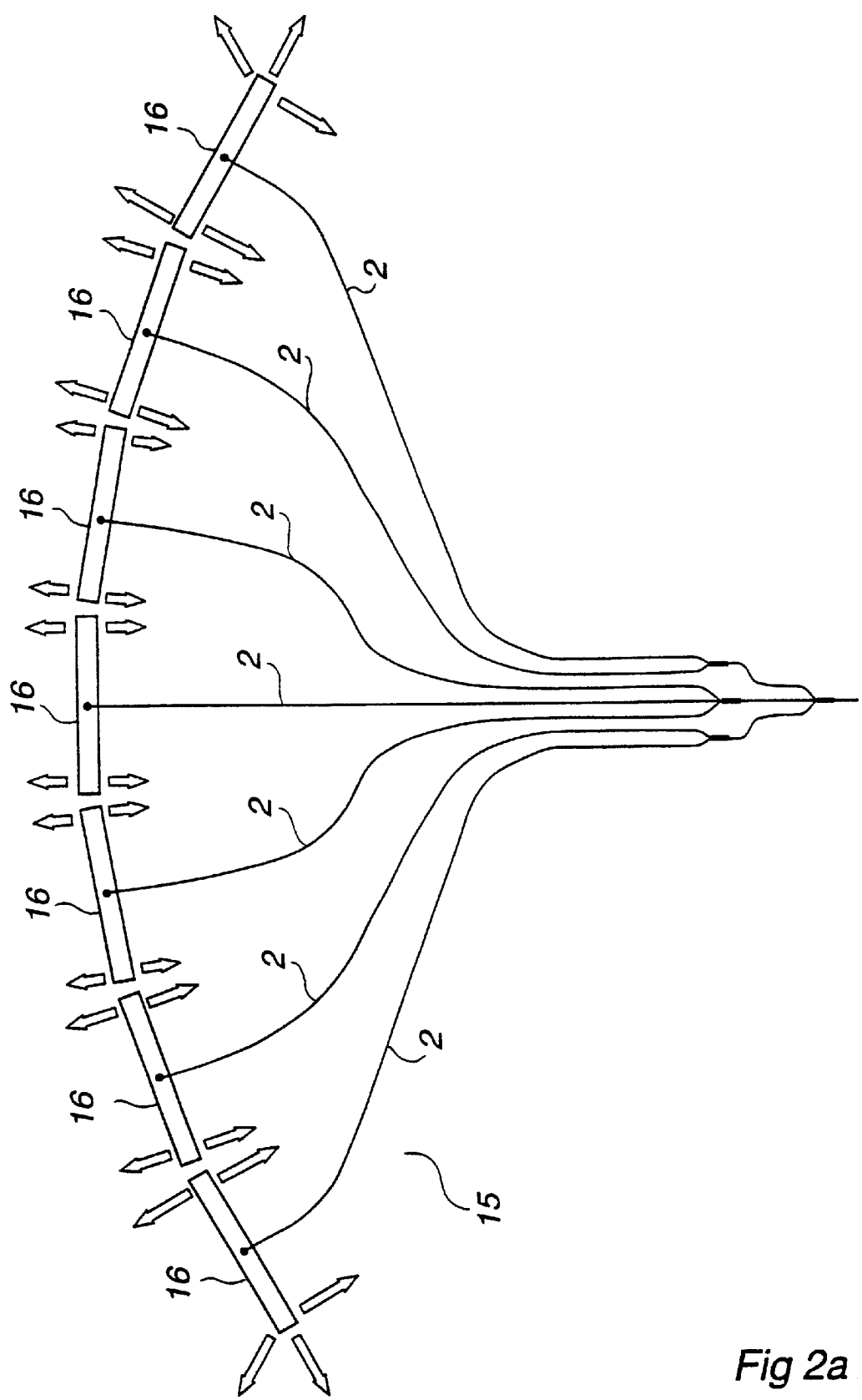
FIG. 2A shows an example of a prior art sea electrode for a HVDC transmission system.
Figure 2B:
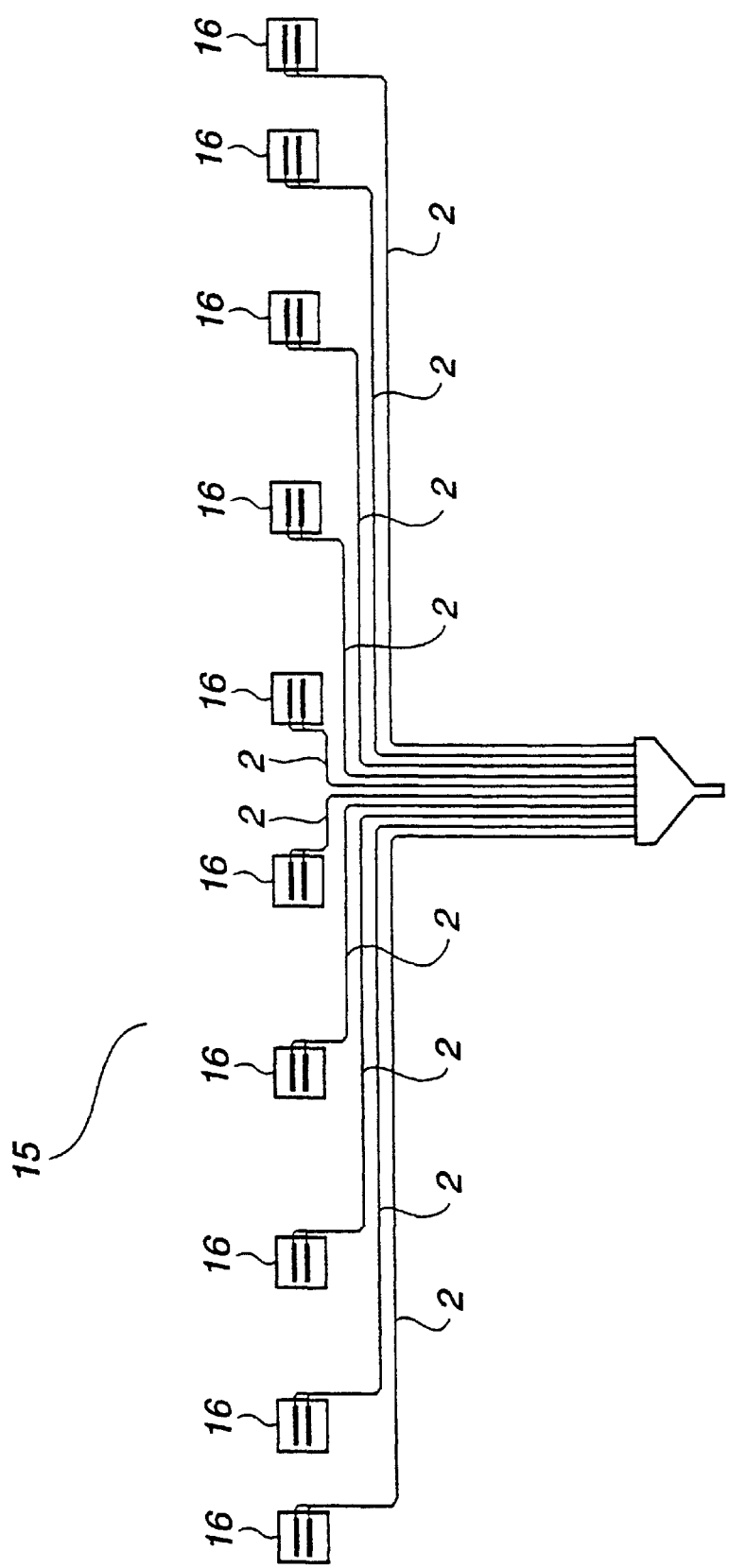
FIG. 2B shows another example of a prior art sea electrode for a HVDC transmission system.

This is illustrated in FIG. 2A with arrows indicating the direction and magnitude of the current along the electrode, and in FIG. 5A with arrows indicating the direction and magnitude of the current along the surface of the sub-electrode element 161.

Figure 5B:
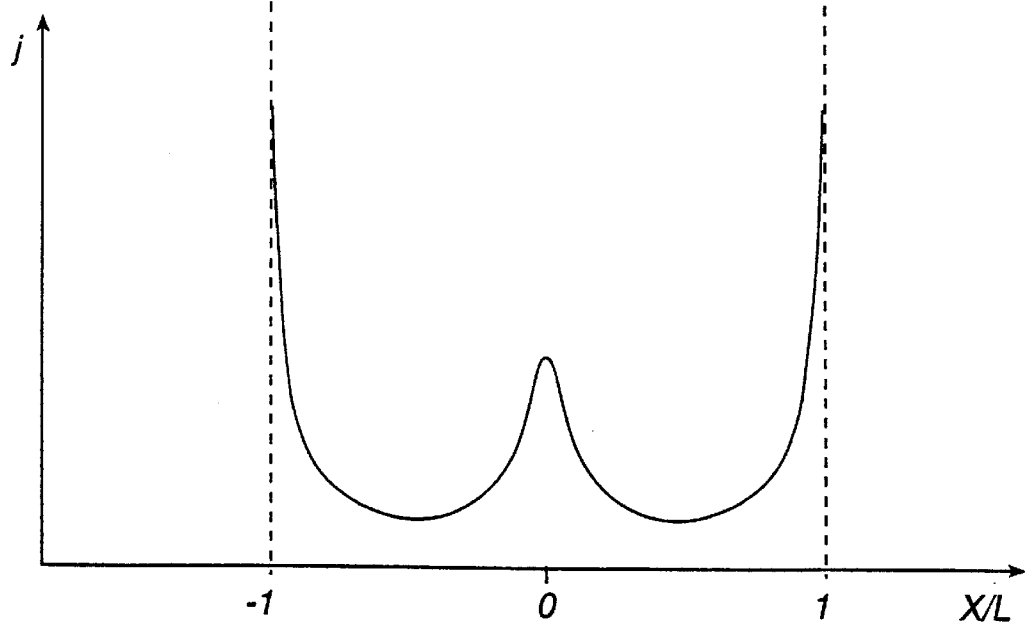
FIG. 5B illustrates the current distribution at the surface of the sub-electrode element according to FIG. 5A along its longitudinal direction.

FIG. 5B shows on its horizontal axis the relative distance x/L along the sub-electrode element according to FIG. 5A as measured from its mid-point and on the vertical axis the current density j at the surface of the sub-electrode element. The diagram illustrates that the principal shape of current density distribution is such that it has maxima at the ends of the sub-electrode element and a local maximum at its feeding point.

Consequently, as the ballast separating the electrode body from the sea water in this context can be regarded as a thin conducting layer, the maximum electric field strength on the surface of the ballast will occur at locations in the vicinity of the surfaces of the sub-electrodes and sub-electrode elements having the highest current density.

Figure 5C:
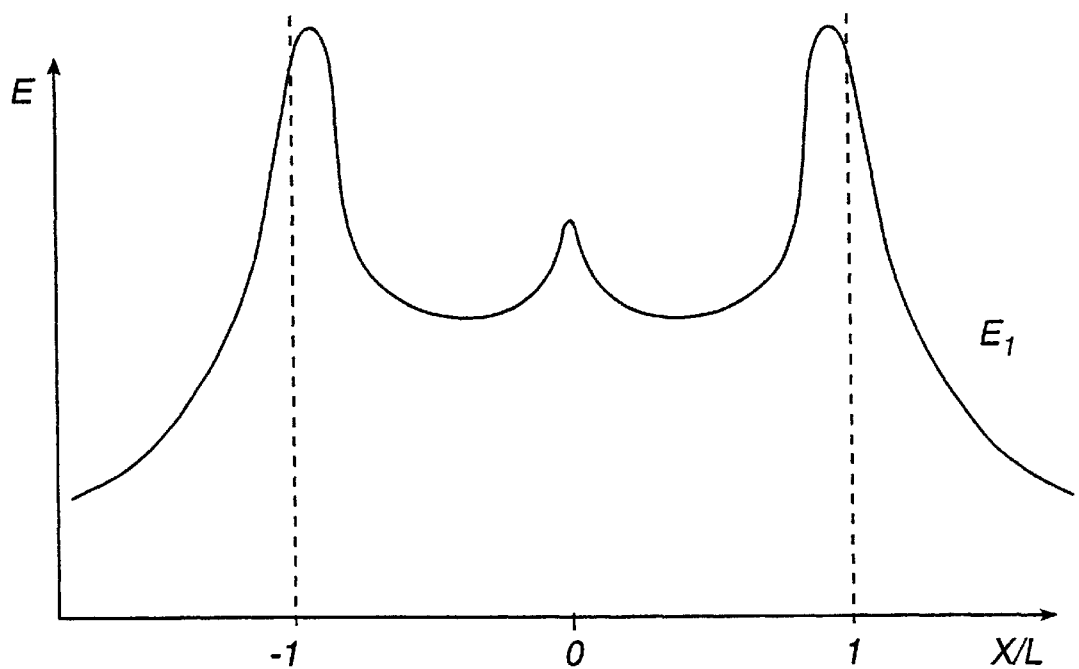
FIG. 5C illustrates the electric field strength distribution at the upper surface of the ballast for a sea electrode according to FIG. 5A, along its longitudinal direction.

FIG. 5C shows on its horizontal axis the relative distance x/L along the sub-electrode element according to FIG. 5A as measured from its mid-point and on the vertical axis the electric field strength E1 along the upper surface 43 of the ballast above the sub-electrode element. The diagram illustrates that the principal shape of the electric field strength distribution is such that it has maxima close to locations above the ends of the sub-electrode element and a local maximum above the feeding point of the element, corresponding to the current density distribution maxima illustrated in FIG. 5B.

Figure 4A:
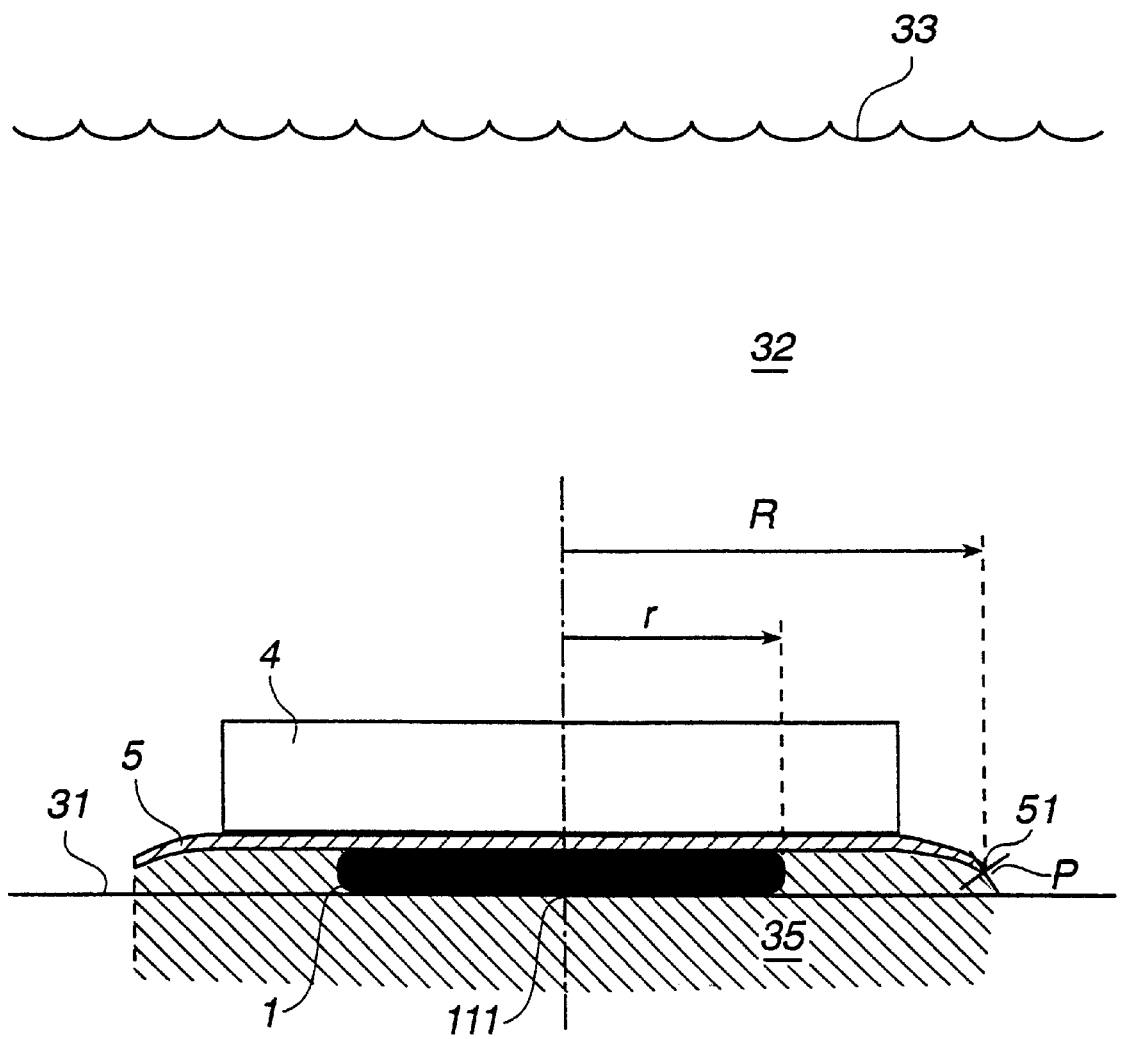
FIG. 4A shows schematically an embodiment of a sea electrode according to the invention.

FIG. 4A illustrates schematically a side view of a sea ground electrode according to the invention. An electrode body 1 is located on the sea bottom 31 and held in place by a ballast 4, in the figure schematically shown as a block of concrete. The electrode body comprises a plurality of sub-electrode elements and the sub-electrodes are arranged in a ring or a number of concentric rings. The electrode is immersed in sea water 32. The surface of the sea water is indicated with reference number 33. The electrode body is fed with a DC current via feeder cables (not shown).

According to the invention, an electrically non-conducting layer 5, for instance made of a polymeric material, is located between the electrode body and the ballast. In this context, electrically non-conducting means that the material has a specific electric resistivity several orders of magnitude, typically at least ten, higher than the specific electric resistivity of the sea water. For material such as polyethylene or polypropylene, the specific electric resistivity is in the order of $10^{12}$ to $10^{15}$ $\Omega*m$.

The material of the non-conducting layer is chosen such that it maintains its lower specific conductivity during long-time immersion in sea water, that is during the service life of the electrode. The electrode body has a maximal horizontal extension equal to 2r. A point P in the sea water, located at the edge 51 of the non-conducting layer, has the horizontal distance R from the mid point 111 of the electrode.

The function of the non-conducting layer above the electrode body can be understood from the following simplified theoretical explanation, which is applicable also for the case where the electrode body and/or the non-conducting layer is, partly or completely, embedded in upper parts of the sea bottom.

It is known that at a boundary surface between an electrically conducting first medium such as sea water, and a second medium, such as the above mentioned non-conducting layer, with a much lower specific conductivity, the vector direction of the current density and the electric field strength is substantially tangential to the boundary surface. Thus, the non-conducting layer will prevent an electric current from entering and penetrating it.

Figure 4B:
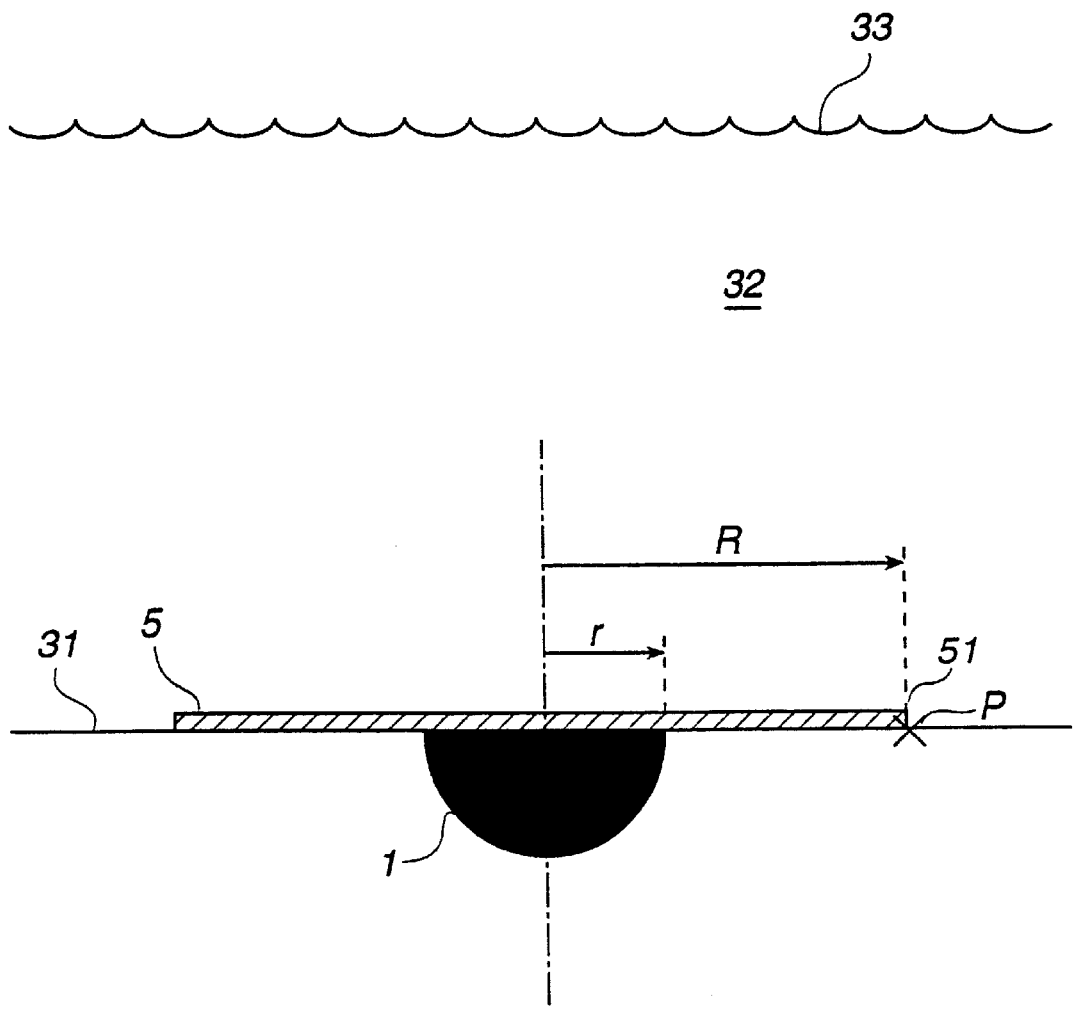
FIGS. 4B–4C illustrate the function of a non-conducting layer according to the invention.

In FIG. 4B, the electrode body of FIG. 4A is replaced by an equivalent half-sphere 1 with a radius r and transferring the same current as the electrode body 1 of FIG. 4A. The half-sphere is located at the boundary between the sea bottom 31 and the sea water 32. For practical purposes, this simplification is justified when the current distribution and the electric field strength in the vicinity of the electrode body are studied at distances from the electrode body comparable to or larger than its radius. The electric field strength at the surface of the half-sphere is $E_o$. Above the half-sphere, a circular non-conducting layer 5 with radius R is located. In a case where the specific electric conductivity of the sea bottom is assumed to be independent of the distance from the electrode body, it can be shown that the electric field strength decreases with the square of the distance from the surface of the electrode body, that is, the field strength E at the point P in the sea water at the edge of the non-conducting layer will be $E=E_o(r/R)^2$.

Figure 4C:
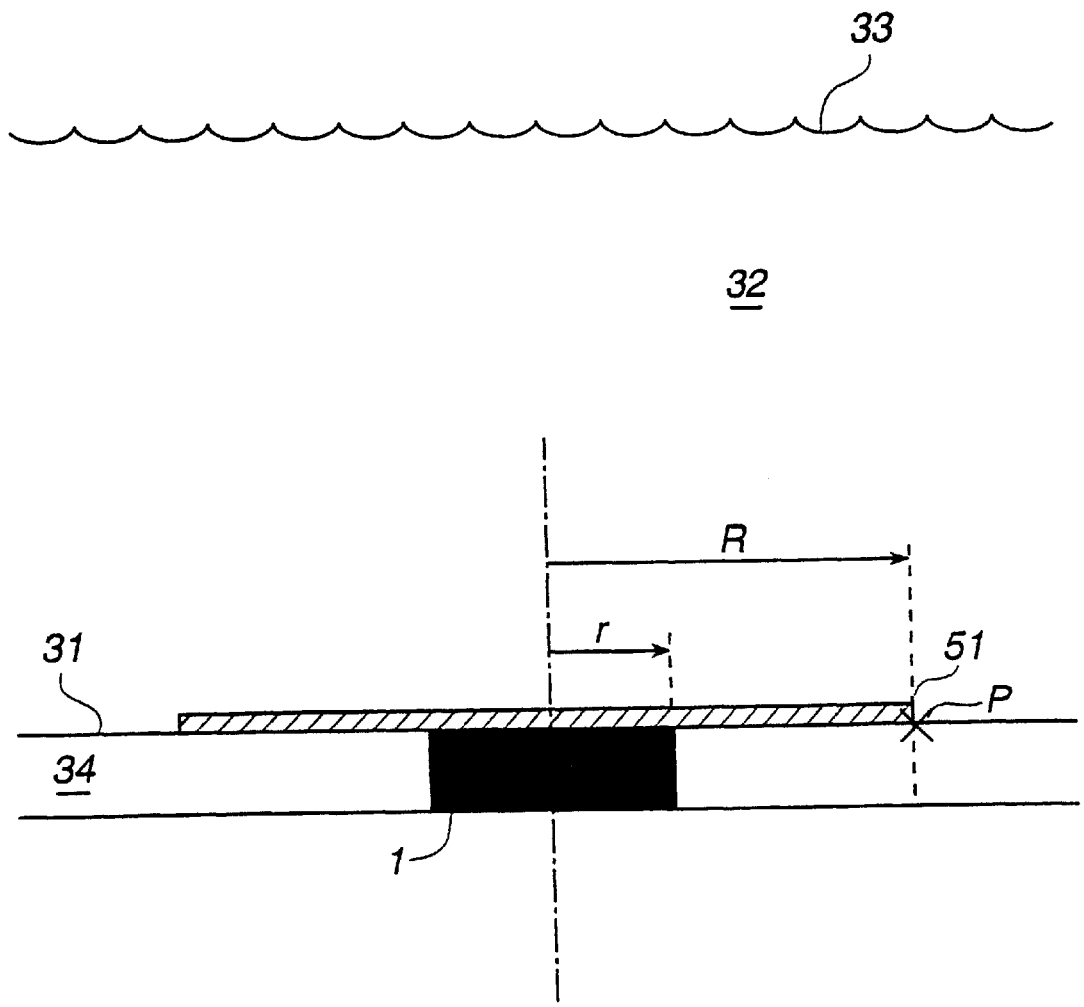

FIG. 4C illustrates a limiting case where it is assumed that the sea bottom comprises a conducting layer 34 at its surface facing the sea water, and that below that layer the sea bottom is non-conducting. In this figure, the electrode body according to FIG. 4A is replaced by an equivalent cylinder 1 with radius r and its axis oriented in the vertical direction, In this case it can be shown that the electric field strength decreases reciprocally with the distance from the surface of the electrode body, that is, the field strength E at the point P in the sea water at the edge of the non-conducting layer will be $E=E_o(r/R)$. This idealization will always give a too low estimate of the field strength reduction, especially at larger distances from the electrode body.

In practice, there may be a certain vertical distance between the electrode body and the non-conducting layer. In order to achieve a significant field strength reduction outside the zone below the non-conducting layer, the extension R of the non-conducting layer shall exceed the vertical distance between the electrode body and the non-conducting layer.

Thus, for practical purposes and depending on bottom conditions of the sea, the electric field strength in the sea water at the edge of a non-conducting layer is reduced by a factor in the range between (r/R) and $(r/R)^2$ as compared with the electric field strength at the surface of the electrode body, r and R being defined as above described in connection with FIGS. 4A–4C. It follows that by choosing the extension R for the non-conducting layer sufficiently large, the maximum electrical field strength in the sea water outside a zone 35 (FIG. 4A) located below the non-conducting layer and in a vertical direction limited by the edge 51 of the non-conducting layer, can always be held below any specified level, as outside the mentioned zone, the electric field strength will always be lower than at the above-mentioned point P.

FIG. 6A shows schematically a cross section in a side view of a sea electrode according to the invention. It comprises a mesh-type sub-electrode element 161 as active part, and a ballast 4 in the form of for instance a concrete structure. The sub-electrode element is located at the sea bottom 31, has the length 2L in the plane of the drawing and is fed at its midpoint, as illustrated in FIG. 3C, from a feeder cable 2. The surface of the ballast 4 facing the sub-electrode element is covered by a non-conducting layer 5.

Figure 6B:
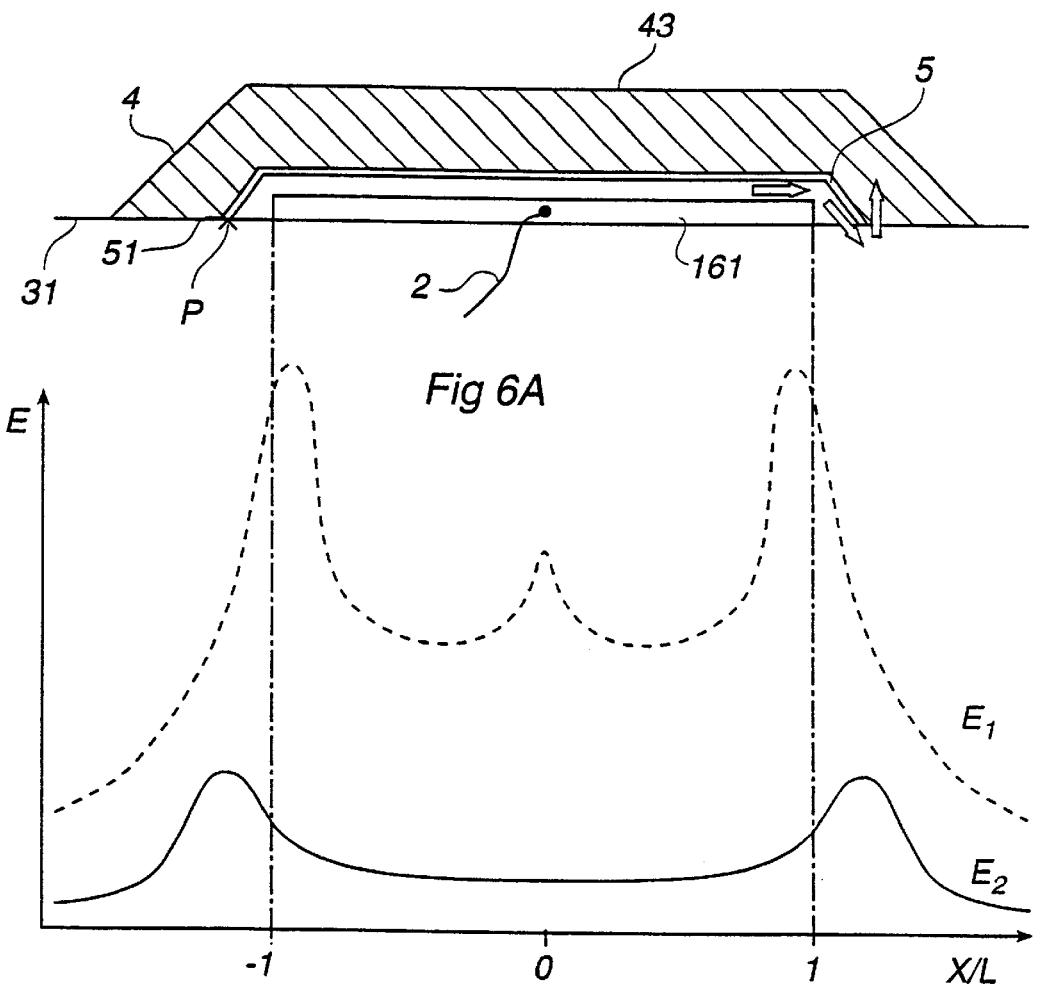
FIG. 6B illustrates the electric field strength distribution at the upper surface of the ballast for a sea electrode according to FIG. 6A, along its longitudinal direction.

FIG. 6B shows on its horizontal axis the relative distance x/L along the sub-electrode element according to FIG. 6A as measured from its mid-point. On the vertical axis the diagram shows the electric field strength E2 along the upper surface 43 of the ballast above the sub-electrode element, and for comparison, as a dotted line, also the electric field strength E1 at the same surface without the non-conducting layer. The diagram illustrates the effect of the non-conducting layer, which is to substantially reduce the electric field strength E2 at locations above the ends of the sub-electrode element and to eliminate the local maximum above the feeding point of the element, appearing in the absence of the non-conducting layer. The maxima of the electric field strength distribution no appears above the edge 51 of the non-conducting layer.

In the configurations described in connection with FIGS. 5A and 6A, only one feeder cable is shown. For the case that different parts of the mesh are interconnected by interconnection cables, that is that the mesh will have a plurality of feeding points for the current, there will, in the FIGS. 5B, 5C and 6B appear local maxima in the current density distribution (FIG. 5B), in the electric field strength E1 (FIG. 5C) and in the electric field strength E1 (FIG. 6B) at respectively above each of the feeding points. However, with an electrode according to the invention, the electric field strength E2 along the upper surface of the ballast will also in this case not change its principal appearance as illustrated in FIG. 6B, that is, all local maxima in the electric field strength E1 above the feeding points, which would appear along the same surface in the absence of a non-conducting layer, will be eliminated by that layer.

For a given configuration of the electrode body, its current distribution can always be calculated by per se known methods. From such a calculation, and with the assumption that the current density and the electric field strength are proportional to each other, the maximum electric field strength (corresponding to the electric field strength $E_O$ in the explanation above) at the electrode body can then be calculated as a starting point for the calculation of the dimensions of the non-conducting layer.

In the embodiments of the invention described below, the distance between the non-conducting layer and the electrode body will always be sufficiently small to justify the above idealizations of the configuration of the electrode body/sub-electrode elements.

Figure 9:
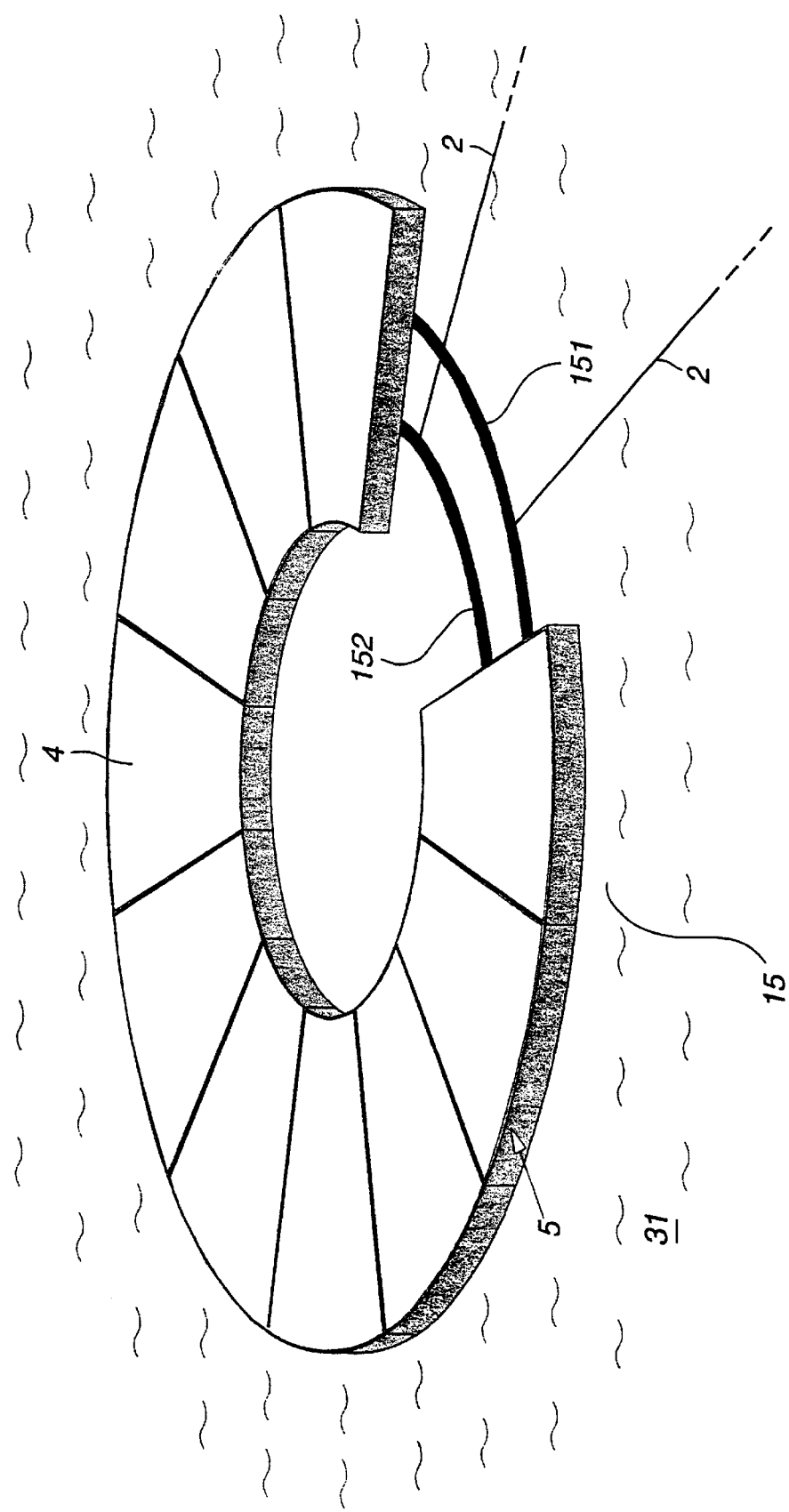
FIG. 9 shows an embodiment of a sea electrode according to the invention, with a ballast according to a development of the invention.

FIG. 9 illustrates an embodiment of a sea ground electrode according to the invention. It comprises an electrode body 1, arranged in two closed concentric rings 151, 152. The rings may comprise sub-electrodes as mentioned above (not shown). The ballast is in the form of a number of sector-shaped cover plates 4, one of which in the figure being removed to show the electrode body. The plates are made of a solid material, for instance concrete. The plates, which cover the electrode rings, are coated with an electrically non-conducting layer 5, at least at their surfaces facing the electrode bodies. The electrode rings are connected to feeder cables 2, electrically insulated against the surrounding water. The sub-electrode elements (not shown) are in the form of cylinders joined to each other to form, as the case may be, sub-electrodes, and the sub-electrodes are then connected to form the rings of the electrode body.

The massive plates placed above the electrode body constitute a good mechanical protection of the electrode body and will prevent damage on it by for instance anchors from ships or large waves. The size of the plates is chosen to facilitate the mounting of the electrode on the sea bottom.

In the embodiment according to FIG. 9, the non-conducting layer is located between the electrode body and the ballast and will thus direct the current transferred by the electrode body along the non-conducting layer and downwards towards the sea bottom and prevent the current from penetrating the ballast and the sea water immediately above the layer.

As is understood from the above, the electric field strength in the sea water in the vicinity of electrode, and in particular outside a zone (corresponding to the zone 35 of FIG. 4A) located below the non-conducting layer and in a vertical direction limited by the edge of the non-conducting layer, can always be influenced to be below a desired level by choosing the dimensions of the non-conducting layer according to the above mentioned principles. This makes it possible to reduce the electric field strength outside the mentioned zone to levels where the above mentioned negative effects on the environment can be avoided.

Alternatively to the embodiment illustrated in FIG. 9, the sub-electrode elements can be of flat shape and then located close to and below the non-conducting layer. Still another alternative is to locate the sub-electrode elements in cavities of the ballast plates, and then accomplish the non-conducting layer as a coating surrounding the sub-electrode elements in three directions, so as to direct, inside the cavity, the current towards the sea bottom only.

The non-conducting layer can also be executed in the form of a separate sheet, for instance made of a polymer foil, arranged above the electrode body, either between the electrode body and the ballast or above the ballast, in both cases it will influence the electric field strength in the vicinity of the electrode body as described above although in this later case it will not be mechanically protected by the ballast. A non-conducting layer in the shape of a foil can be covered or embedded in a ballast executed as a covering of gravel.

A suitable material for such a foil can be glass fiber reinforced polyethylene, typically of a thickness in the order of 12–15 mm.

In another embodiment of the invention the ballast can be executed as a container made of a non-conducting material, filled with for instance sand or gravel and located above the electrode body, at least a part, typically the bottom wall, of the container constituting the non-conducting layer.

For plates made of steel armored concrete, the concrete becomes electrically conducting after immersion in sea water for some time. Then all surfaces of the plates shall be coated with the non-conducting material, to avoid any corrosion of the steel armoring caused by currents entering the concrete.

Massive plates with an electrically non-conducting covering or containers made of non-conducting material can be mounted together with sub-electrode elements, constituting prefabricated units, for example sub-electrodes, for easy assembling on the sea bottom.

Thus, a sea electrode according to the invention comprises an electrode body to be placed at the sea bottom and held in place by a ballast in the form of a heavy covering, and in addition, a non-conducting layer located above and extending over the electrode body.

At sub-electrode elements of elongated shape, such as for example cylinders and flat meshes, substantially enhanced electric field strengths will occur locally, typically at the ends of the sub-electrode elements, resulting in current densities which locally are substantially higher than the average value for the electrode body.

In an advantageous development of the invention, preferable where the sub-electrode elements are of an elongated form, the sea electrode further comprises at least two electrically non-conducting barriers, spaced apart along the sub-electrode element, and between which is formed an active part of the surface of the sub-electrode element, said barriers having a substantial extension outwards from the active part of the surface of the sub-electrode element into the sea water and/or sea water impregnated matter at the sea bottom. As will be further explained below, the barriers will act as barriers to the current lines at the sub-electrode element, which current lines, in the vicinity of the surfaces of the barriers, will be directed along these surfaces. The barriers will thereby homogenize the current distribution along the active part of the surface of the at least one sub-electrode element. A current line, as mentioned above, is to be understood as a line such that, at every point of it, the current density vector at that point is tangential to the line.

Figure 7A:
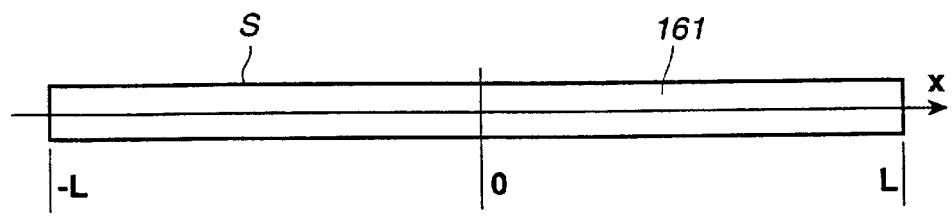
FIG. 7A shows a prior art cylinder-shaped sub-electrode element.

FIG. 7A shows a conventional cylinder-shaped sub-electrode element 161 of a highly conducting material. The sub-electrode element is embedded in a surrounding conducting medium, such as for example sea water, (not shown) with a specific conductivity several orders of magnitude below the specific conductivity of the material of the sub-electrode element, and also assumed to transfer a current to the medium, that is to operate as an anode. The length of the sub-electrode element is 2L and the envelope surface S of the sub-electrode element constitutes the active part of its surface.

Figure 7B:
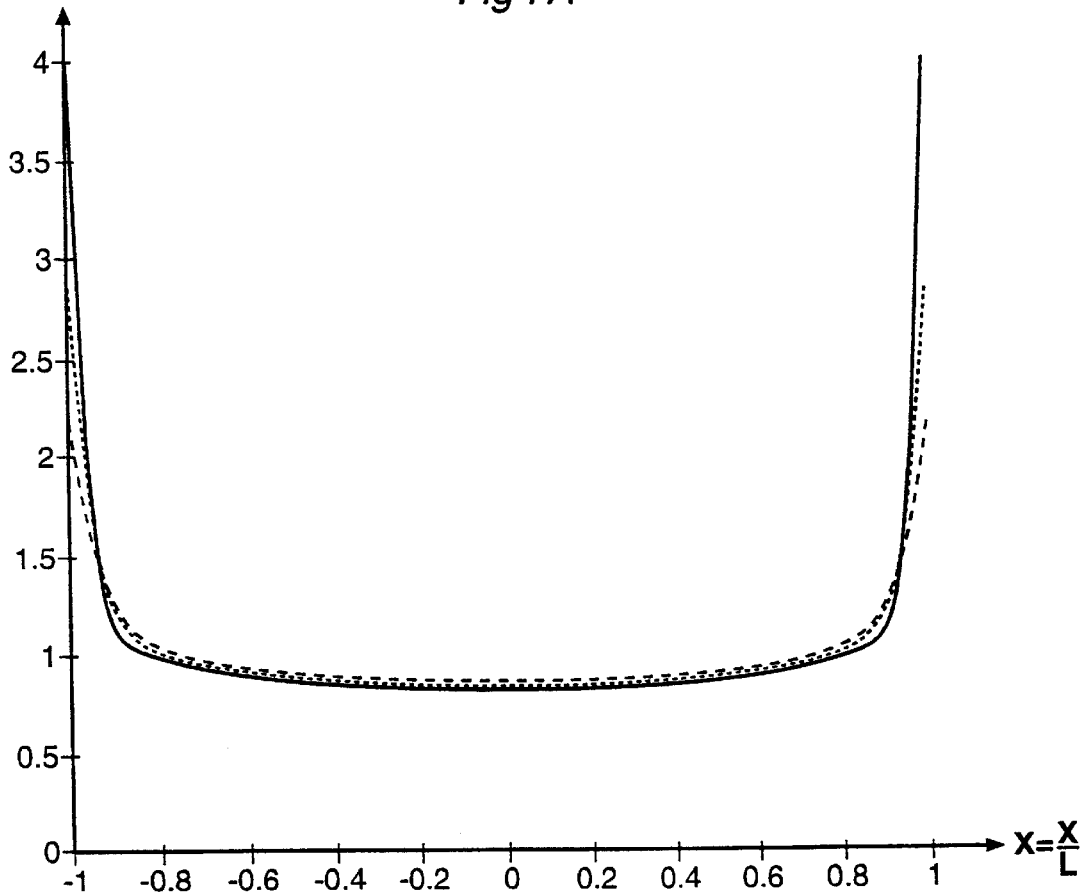
FIG. 7B shows the current distribution at a sub-electrode element according to FIG. 7A.

FIG. 7B shows on the vertical axis the normalized local current density J/Javg at the surface of the sub-electrode element, where J is the actual current density at a relative distance X/L along the sub-electrode element from the mid of it, and Javg is the average value of the current density along the sub-electrode element. The horizontal axis shows the relative distance X/L with positive direction to the right in the figure. It is known that the current distribution is dependent on the so called specific anodic polarization resistivity. The diagram shows the normalized current density as a function of the relative distance for three different values of specific polarization resistivities $b_a$, in the range between $0.02 \, \Omega*m^2$ to $0.08 \, \Omega*m^2$, $b_a=0.02 \, \Omega*m^2$ (whole line) representative for silicon iron, $b_a=0.04 \, \Omega*m^2$ (short-dashed line) representative for graphite and $b_a=0.08 \, \Omega*m^2$ (long-dashed line) representative for magnetite, under the assumption that the mentioned materials are in contact with sea water.

In the specific example, the cylinder is 1 m long and has a diameter of 3 cm. The FIG. 7B shows that the normalized current density increases rapidly in the neighborhood of the ends of the sub-electrode element and that its maximum value increases with decreasing polarization resistivity.

Figure 8A:
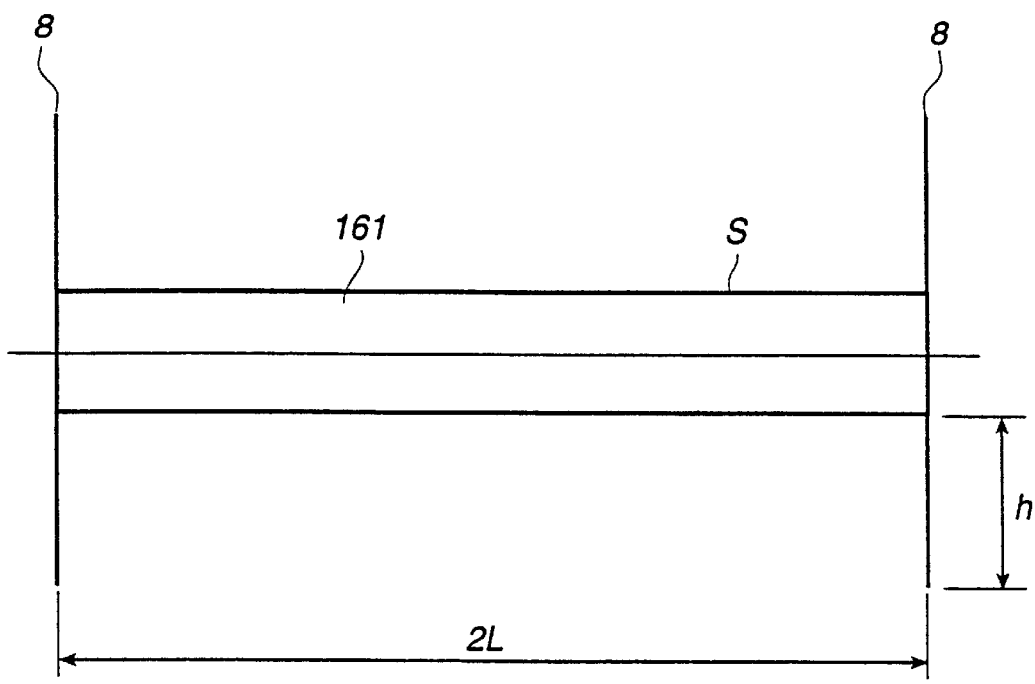
FIG. 8A shows an embodiment of a cylinder-shaped sub-electrode element provided with non-conducting barriers according to a development of the invention.

FIG. 8A shows schematically a sub-electrode element 161 of the same kind and embedded in a medium with similar properties as described in connection with FIG. 7A. The sub-electrode element is, according to the invention, equipped with two barriers 8, one at each end. The barriers are made of a non-conducting material, chosen such that they maintain their non-conducting properties during the service lifetime of the electrode, for instance polyethylene or polypropylene. They have the shape of circular discs, with their plane perpendicular to the sub-electrode element. The radius of the barriers is such that their circumferences extend with a distance h outwards from the envelope surface of the cylinder.

The effect of the barriers on the current distribution along the active part of the sub-electrode element surface is to homogenize the current distribution. The barriers act as barriers to the current lines, which, in the vicinity of the surfaces of the barriers, will be directed along these surfaces.

Thus, the barriers homogenize the current distribution along the sub-electrode element.

Figure 8B:
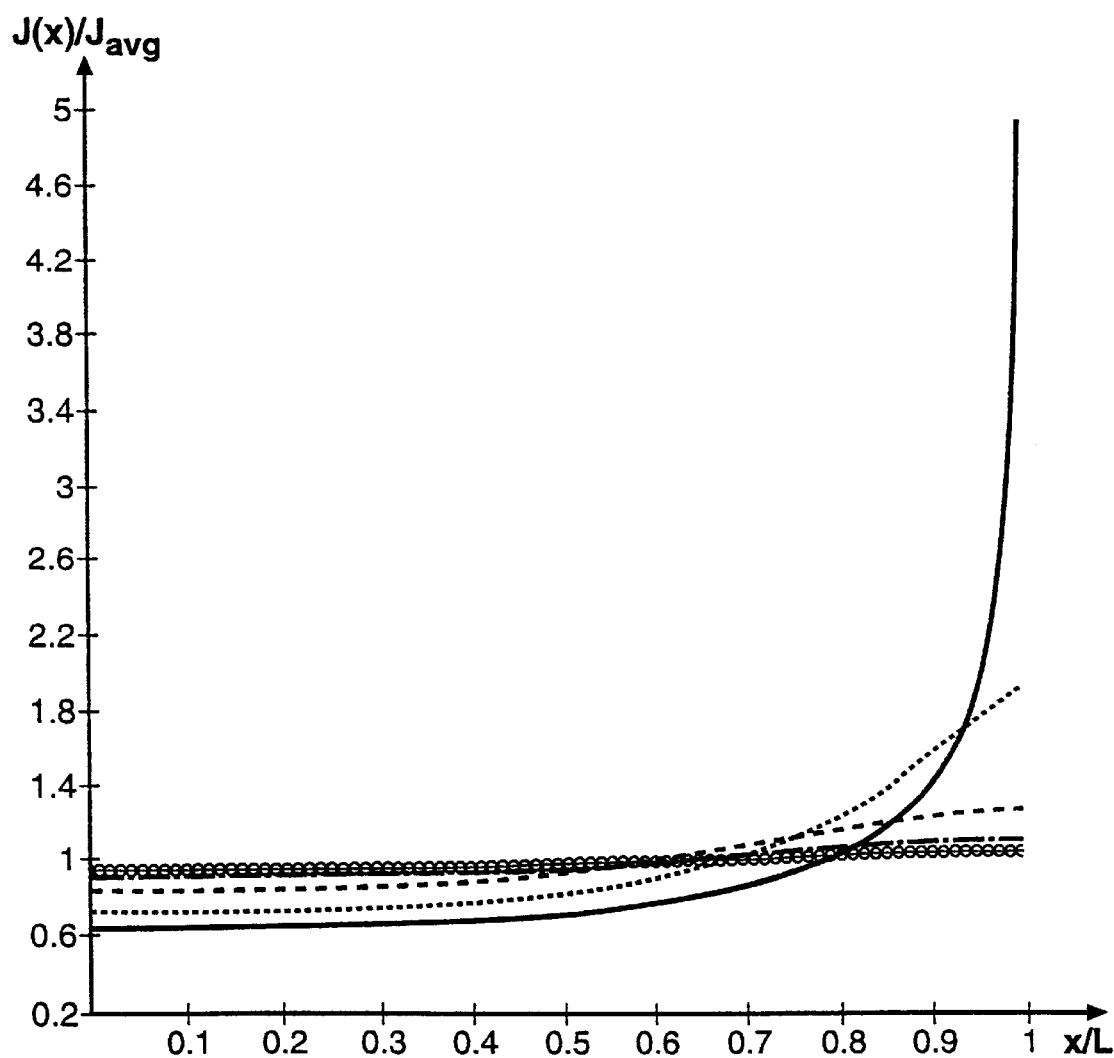
FIG. 8B illustrates the effect of non-conducting barriers according to FIG. 8A on the current distribution along a cylinder-shaped sub-electrode element.

FIG. 8B shows on the horizontal axis the relative distance X/L with positive direction to the right in the figure, and on the vertical axis the ratio J(x)/Javg, where J(x) is the actual current density at a relative distance x/L along the sub-electrode element according to FIG. 8A, from the mid of it, and Javg is the average value of the current density along the sub-electrode element. For a comparison, the same ratio is plotted as a whole line for a similar sub-electrode element without barriers. The ratio is calculated for specific polarization resistivity $b_a=0.02 \, \Omega*m^2$ and the short-dashed line shows the homogenizing effect of a barriers with a ratio h/L=0.1, the long-dashed line with a ratio h/L=0.3, the point-dashed line with a ratio h/L=0.5, and the line with circles on it with a ratio h/L=0.7.

As can be seen in the figure, already for a ratio h/L=0.5, the maximum current density, at any point at the surface of the sub-electrode element, will be only about 12% higher than the average current density, which for most practical purposes is a sufficient value.

In certain cases, especially for long sub-electrode elements, a plurality of barriers, spaced apart along the whole sub-electrode element, can be used to obtain the desired homogenizing effect. The same effect as described above is then achieved for each part of the sub-electrode element located between two adjacent barriers, spaced along the cylinder with the distance 2L between them, and with each barrier having the height ratio h/L. Studies have shown that an overall optimized homogenizing effect for a sub-electrode element can be achieved with different distances between pairs of adjacent barriers.

Substantially, the same homogenizing effect can be achieved also with barriers and sub-electrode elements with different geometries. Thus, the barriers as described in connection with FIG. 8A must not necessarily be in the shape of circular discs, but could also be in the shape of plates with, for example, a rectangular or quadratic form, for instance such as is illustrated in the FIG. 10 described below. Also as an example, for cylindrical sub-electrode elements, the barriers could exhibit a convex surface towards that part of the sub-electrode element on which the homogenizing effect is desired. However, the homogenizing effect achieved will depend on the projected dimensions of the barriers, as projected on a plane substantially perpendicular to a longitudinal axis through the mentioned part of the sub-electrode element as well as on the shape of the barriers.

Figure 3A:
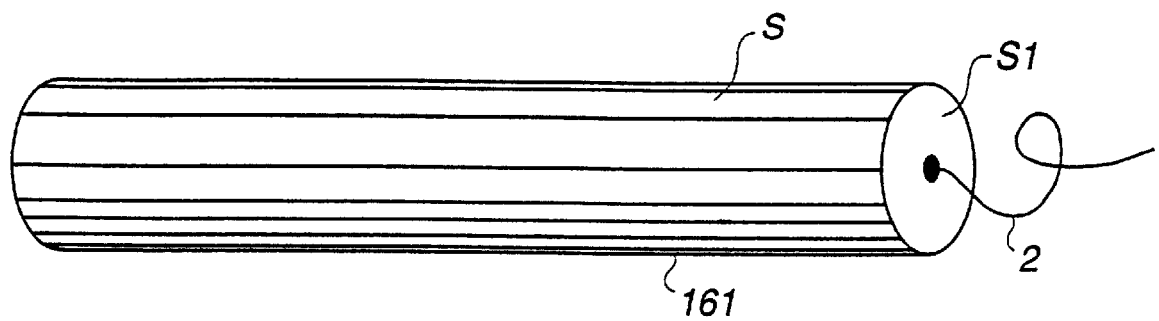
FIGS. 3A–3D shows various prior art sub-electrode elements.
Figure 3B:
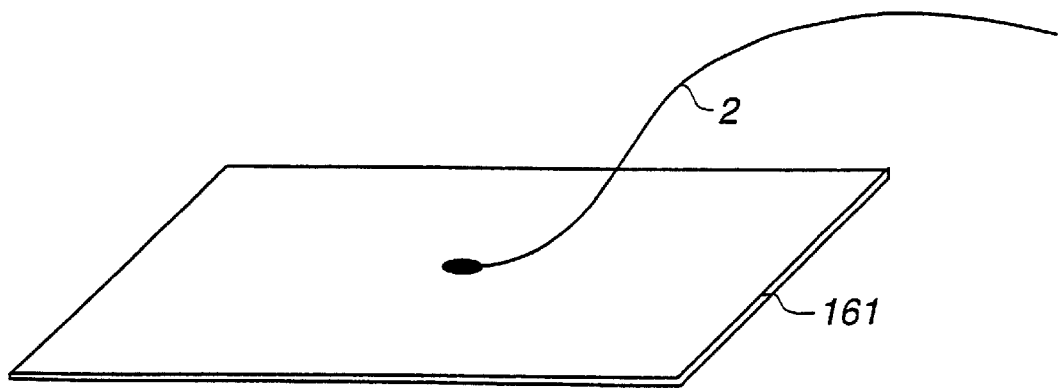
Figure 3C:
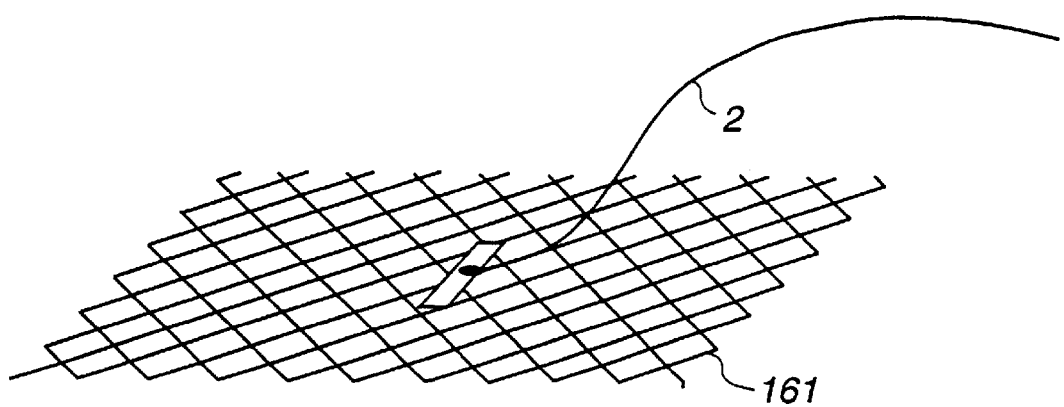
Figure 3D:
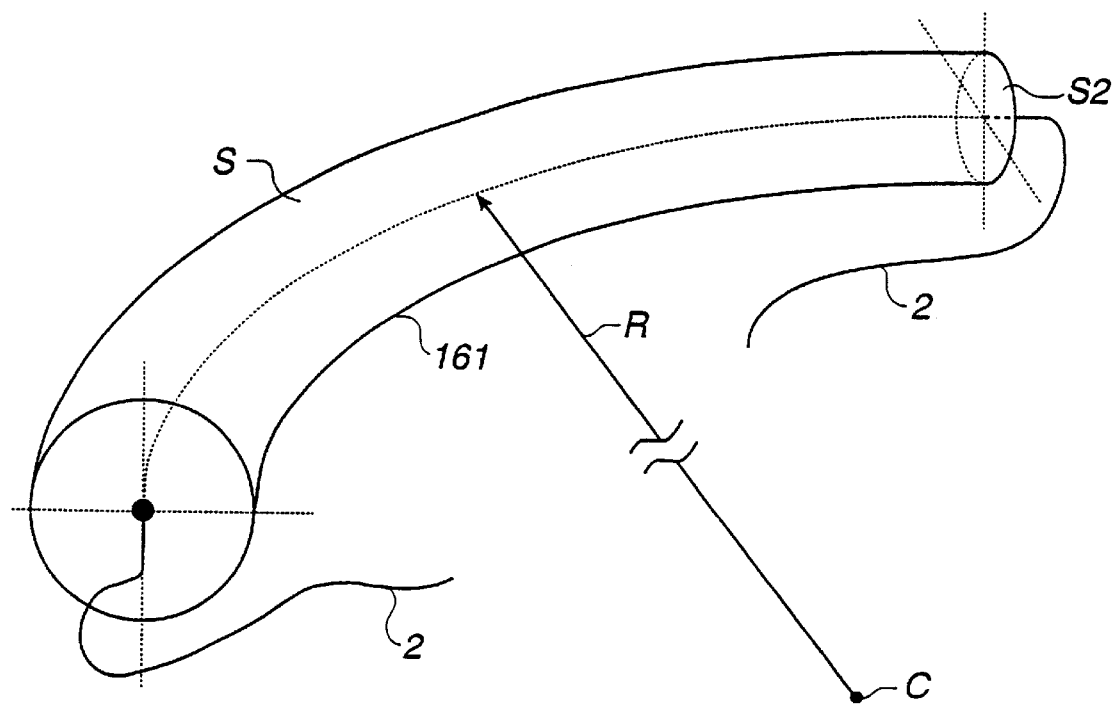

In case the sub-electrode or the sub-electrode element has a flat shape, as for instance illustrated in FIGS. 3B and 3C, the barriers could preferably be given the shape of a plate, adapted to the dimensions of the sub-electrode or the sub-electrode element.

Thus, with elongated sub-electrode elements equipped with barriers according to the invention, a more homogeneous current distribution along the surface of the sub-electrode element can be achieved. The negative effects of local high current density, such as low utilization of the electrode and for instance enhanced local electrode dissolution, are then substantially reduced.

Figure 10:
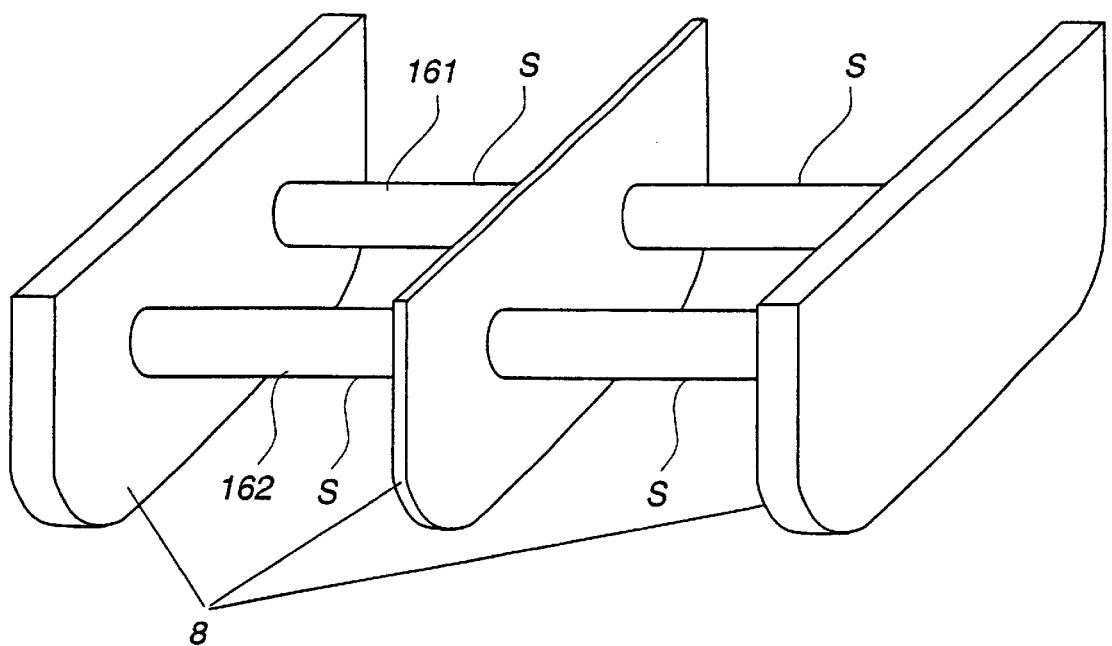
FIG. 10 shows a pair of cylinder-shaped sub-electrode elements with non-conducting barriers according to a development of the invention, also serving as mechanical supports.

FIG. 10 shows an embodiment of the invention with two sub-electrode elements 161, 162 respective, equipped with three barriers 8 of a non-conducting material, such as for example polyethylene or polypropylene. The barriers are common for the two sub-electrode elements and one barrier is located at each end of the sub-electrode elements and one is located at the mid of the sub-electrode elements. In this embodiment of the invention, the barriers also serve as sub-electrode element mechanical supports.

Figure 11A:
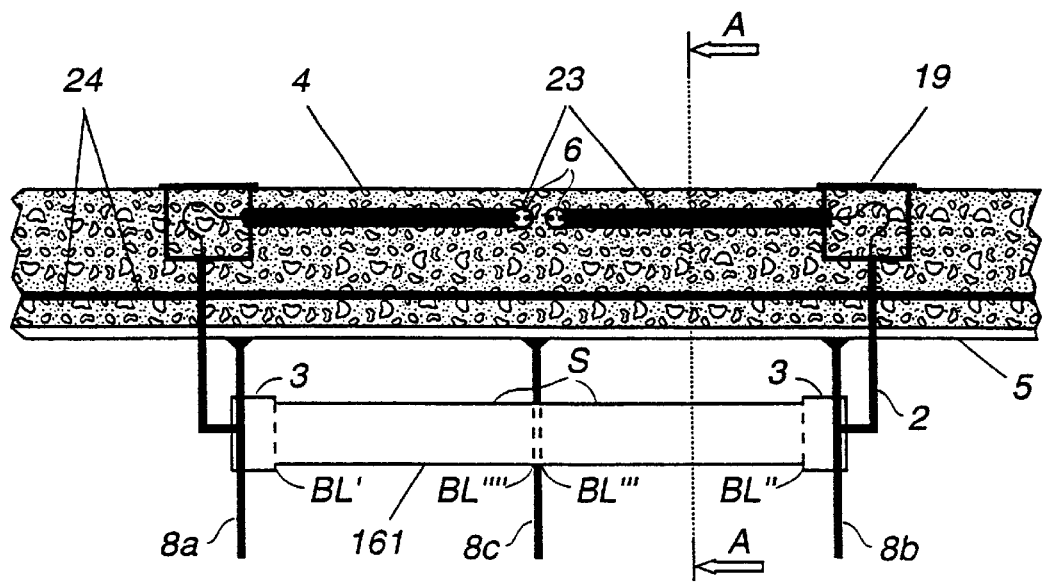
FIG. 11A shows a side view of a part of an electrode according to an embodiment of the invention, with sub-electrode elements according to FIG. 10 arranged at an armored concrete plate.

FIG. 11A shows a side view of an embodiment of the invention where sub-electrode elements as described in connection with FIG. 10 are joined to cover plates 4 to form a sub-electrode. The cover plates are made of armored concrete, and are coated with a non-conducting material 5 on their bottom and side walls. The feeder cables 2 (one shown in the figure) to the sub-electrode are connected to a main feeder cable 6 via connection boxes 19 in the plates. The main feeder cables are placed in tubes 23 embedded in the concrete.

FIG. 11A shows a sub-electrode element 161 equipped with three barriers 8a, 8b, one at each end of the sub-electrode element, and a barrier 8c, located between the two first mentioned barriers. The barriers 8a and 8b are each provided with a sleeve 3 of a non-conducting material of the same kind as the material for the barriers, which sleeve may be an integral part of the respective barrier. The sleeves 3 serve as mechanical supports for the barriers when they are mounted on the sub-electrode element. The active part S of the surface of the sub-electrode element is in this case the envelope surface of the sub-electrode element less its cross section areas (covered by the barriers 8a and 8b), and less the parts of its envelope surface which are covered by the two sleeves 3 and covered by the barrier 8c. The border lines of the active part S are in this case the lines along which the envelope surface of the sub-electrode element adjoins the respective sleeves (BL' and BL" in the figure), that is, at the edges of the sleeves facing the active part of the surface, and the lines along which the envelope surface of the sub-electrode element adjoins the barrier 8c (BL''' and BL"" in the figure).

The two barriers 8a and 8b are located at the ends of the cylindrical electrode, projecting from it in a direction substantially perpendicular to the active part of its surface. Theoretically, these two barriers shall preferably be located at the border lines BL' and BL", respectively, but for practical purposes, a sufficiently homogenizing effect on the current distribution is achieved also when the barriers, for instance for mechanical design reasons as described above, are displaced from this border lines along the longitudinal direction of the sub-electrode element. However, the displacement of the barriers from the mentioned border lines shall preferably be small in relation to the dimensions of the barriers in a plane perpendicular to the active part of the surface, so that the barriers are located at or close to these border lines, the wording 'close to' to be understood as so close that the desired homogenizing effect of the barriers is achieved.

Also, theoretically, it is preferable that the barriers, at least at the surface of the sub-electrode element, shall project in a direction which is substantially perpendicular to the active part of the surface of the sub-electrode element. However, for practical purposes, where for example the barriers exhibit a convex surface towards that part of the sub-elecrode element on which the homogenizing effect is desired, can be designed to achieve the desired homogenizing effect, provided the dimensions of the barriers as projected on a plane substantially perpendicular to the active part of the surface of the sub-electrode element are made sufficiently large.

Figure 11B:
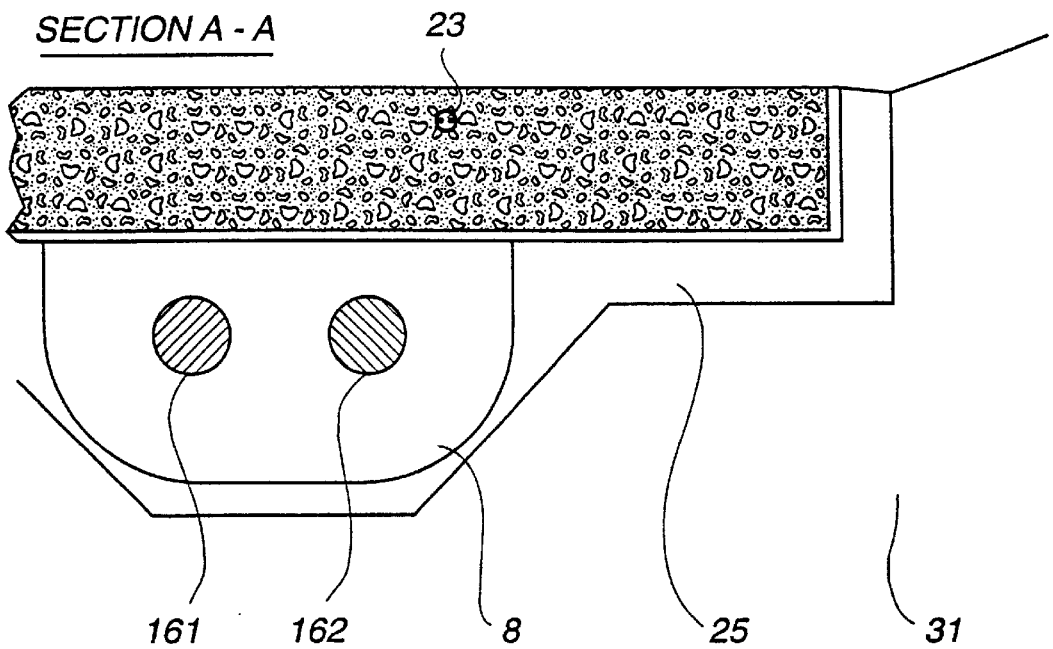
FIG. 11B shows a section through FIG. 11A along the line A—A of that Figure.

FIG. 11B shows the embodiment of FIG. 11A seen from the section A—A of that figure.

Figure 12A:
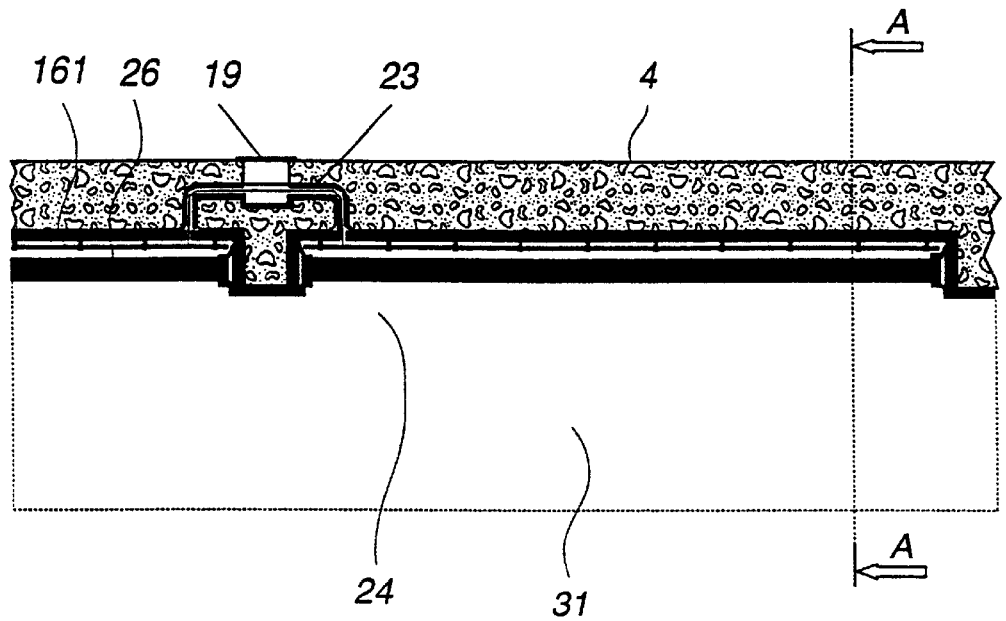
FIG. 12A shows a side view of a part of an electrode according to an alternative embodiment of the invention, with flat sub-electrode elements located within cavities in a concrete plate.

FIG. 12A shows another embodiment of the invention where a cover plate 4 made of armored concrete is placed on a gravel bed 24 on the sea bottom 31. The plate has a cavity 4a (FIG. 12B) at its downward facing side which cavity contains a number of flat sub-electrodes, in the form of meshes. Mechanical protection shields 26, made of a non-conducting material or coated with non-conducting material, arranged as a number of parallel oriented tubes, are located below the sub-electrodes. A coating 5 of non-conducting material constitutes a non-conducting layer as described above.

Figure 12B:
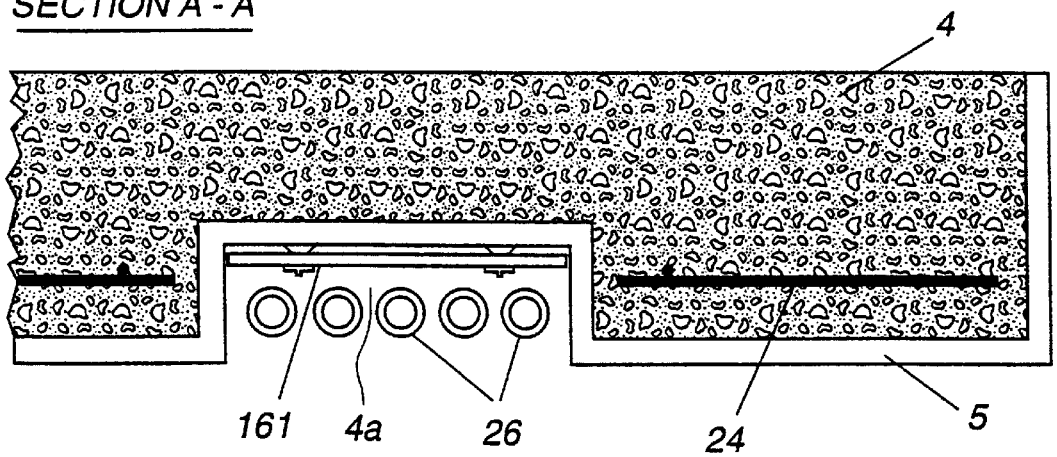
FIG. 12B shows a section through FIG. 12A along the line A—A of that figure.

FIG. 12B shows the embodiment of FIG. 10A seen from the section A—A of that figure.

Figure 13A:
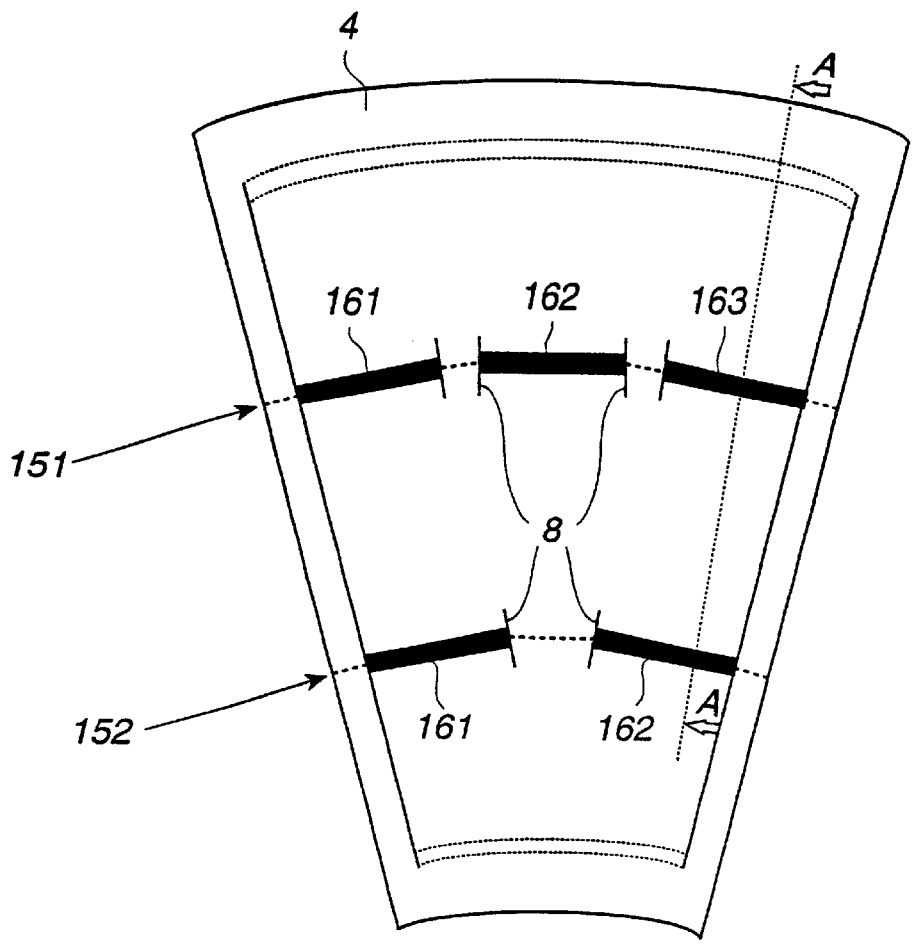
FIG. 13A shows a section of an electrode, seen from below, according to another embodiment of the invention, with a ballast on the form of concrete plate with coated side walls.

FIG. 13A shows a section of a sea electrode of the kind described in connection with FIG. 9, seen from below. The section comprises a sector-shaped cover plate 4 and sections of the two concentric rings 151, 152, forming the electrode body. The section of the outer ring 151 comprises sub-electrode elements labeled 161, 162, 163, interconnected with interconnection cables in a series connection, and the inner ring 152 is of similar kind. The sub-electrode elements are provided with barriers 8 as described above.

Figure 13B:
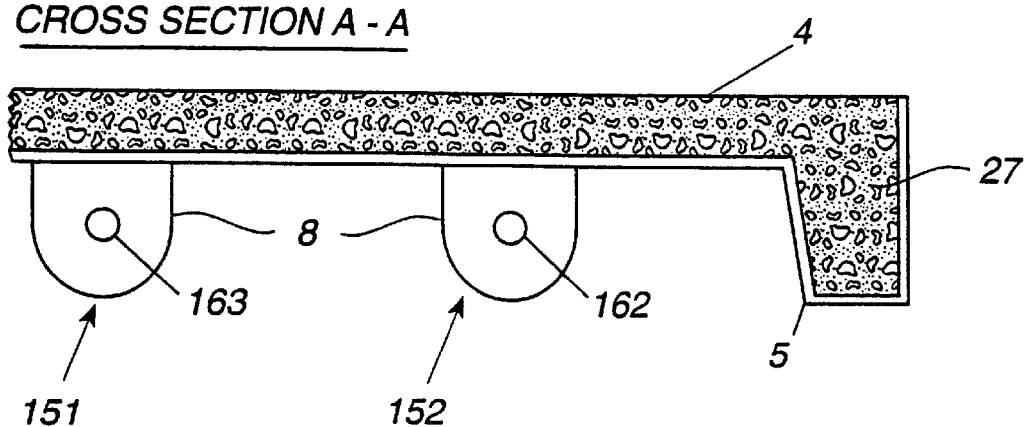
FIG. 13B shows a section through FIG. 13A along the line A—A of that figure.

FIG. 13B shows the embodiment of FIG. 13A seen from the section A—A of that figure. The plate 4 is coated with a non-conducting material 5 on the surface facing the rings and on side walls 27 of the plate.

The side walls serve as a mechanical protection and as a mechanical support for the plate, reducing or eliminating the load on the sub-electrodes and the sub-electrode element supports. The coating 5 constitutes the non-conducting layer.

In designs similar to the one described in connection with FIGS. 13A–13B, the electrode body can comprise at least one ring, and as the case may be, several rings.

An electrode as described in connection with FIGS. 13A–13B, designed for a current in the order of 1400 A, would typically have a diameter of the outer ring 151 of about 16 m. In order not to exceed a maximum electric field strength of 1 V/m in the sea water in the vicinity of the electrode the diameter of the non-conducting layer would be about 19 m.

Arrangements as shown in FIGS. 11A–11B to 13A–13B are also possible to implement with ballasts in the form of containers filled with for instance gravel, concrete or sand. The walls of the containers can then be made of a non-conducting material and at least a part of the container, for instance the bottom wall, can then constitute the layer of non-conducting material. As an example, in FIG. 13B, the layer 5 can thus illustrate a container wall and the item 27 indicate for example gravel filling the container.

In embodiments where the electrode arrangements comprise massive plates or gravel filled containers, the plates or containers can be equipped with electrically insulated channels for release of gases produced by electrolysis on the electrode body in order to avoid gas accumulation beneath the plates or containers.

The non-conducting barriers according to the development of the invention are applicable to sub-electrodes and to sub-electrode elements of various shapes, including the shapes as illustrated in FIGS. 3A–3D.

Thus, this development of the invention includes an electrode with substantially reduced current distribution inhomogeneity at the electrode surface. This is achieved by providing the sub-electrode element of the electrode with at least two electrically non-conducting barriers, spaced apart along the sub-electrode element and extending into the medium surrounding the electrode.

Figure 2C:
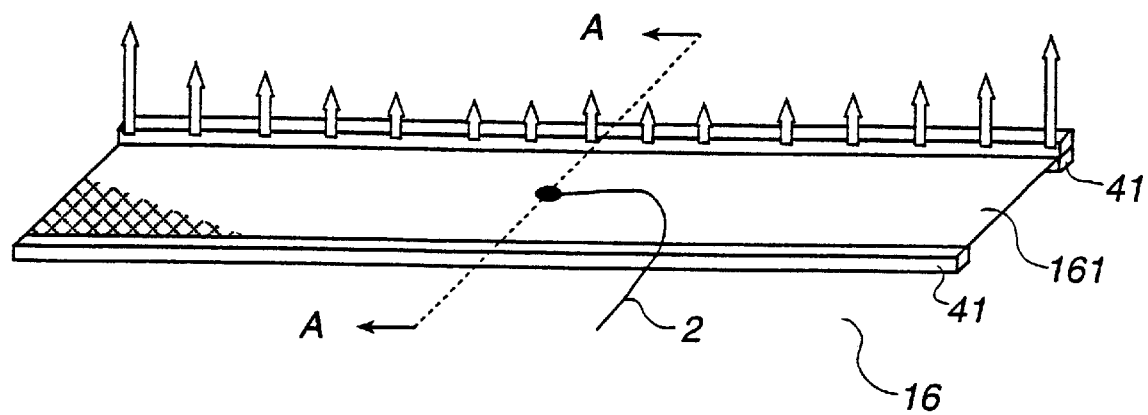
FIG. 2C shows a prior art sub-electrode of mesh-type, comprised for example in a sea electrode according to FIG. 2A.
Figure 2D:
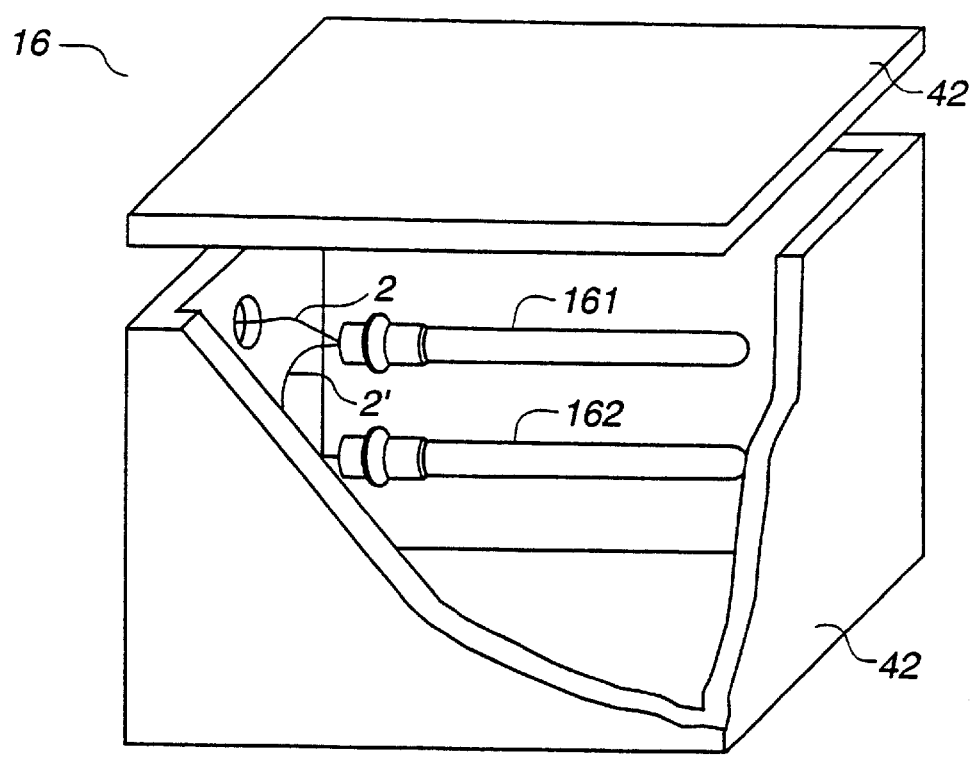
FIG. 2D shows a prior art sub-electrode with cylinder-shaped sub-electrode elements, comprised for example in a sea electrode according to FIG. 2B.

An advantageous development of the invention is illustrated in FIG. 14. The figure shows in a perspective and cut-up view a part of a sub-electrode element 161 similar to the one described in connection with FIG. 2C (feeding points are not shown).

According to the above described development of the invention, the sub-electrode element is provided with two barriers 8a, 8b, manufactured from an electrically non-conducting material. The barriers are in this embodiment formed by four beams 8aa, 8ab, 8ba, 8bb, each having an L-profile and running along the sub-electrode element.

The beams are located between concrete slabs 41a, 41b, 41c and 41d respectively, in such a way that one leg 8aa" of the L-profile of the beam 8aa and one leg 8ab" of the L-profile of the beam 8ab are located between the slabs 41a and 41b, and one leg 8ba" of the L-profile of the beam 8ba and one leg 8bb" of the L-profile of the beam 8bb are located between the slabs 41c and 41d. The other legs 8aa', 8ab', 8ba' and 8bb' of the L-profiles are thereby arranged so that the legs 8aa' and 8ab' together form one side barrier 8a and the legs 8ba' and 8bb' together form another side barrier 8b, facing the first mentioned side barrier. Parts of the sub-electrode element are extending in between the legs 8aa" and 8ab" and in between the legs 8ba" and 8bb", respectively, and these legs are formed so that those extending parts of the sub-electrode element become electrically insulated from the conducting medium (not shown in detail in the figure). The active part of the sub-electrode element is located between the two barriers so that it has a border line BL' located at the edge of the beams 8aa", 8ab", facing the beams 8ba", 8bb", and a border line BL" at the edge of the beams 8ba", 8bb", facing the beams 8aa", 8ab".

The beams are kept in place by the weight of the concrete slabs, or alternatively, the concrete slabs may be fixed to each other by a clamping device (not shown).

According to this development of the invention, the active part of the surface of the sub-electrode element is embedded between an upper layer 25b and a lower layer 25a, constituting a backfill for the electrode element. The layers comprise an electronically conductive material, such as a carbonaceous material, for example coke. The upper layer 25b is covered by a thin layer of gravel 24 to keep the layer 25b in place.

By this development of the invention, the intensity of electro-chemical reactions between the material of the electrode element and the sea water will be decreased, and accordingly also the amounts of reaction products emanating from such reactions.

Such an embedding is of course also applicable to other configurations of the sub-electrode/electrode as described in in this application.

Figure 15:
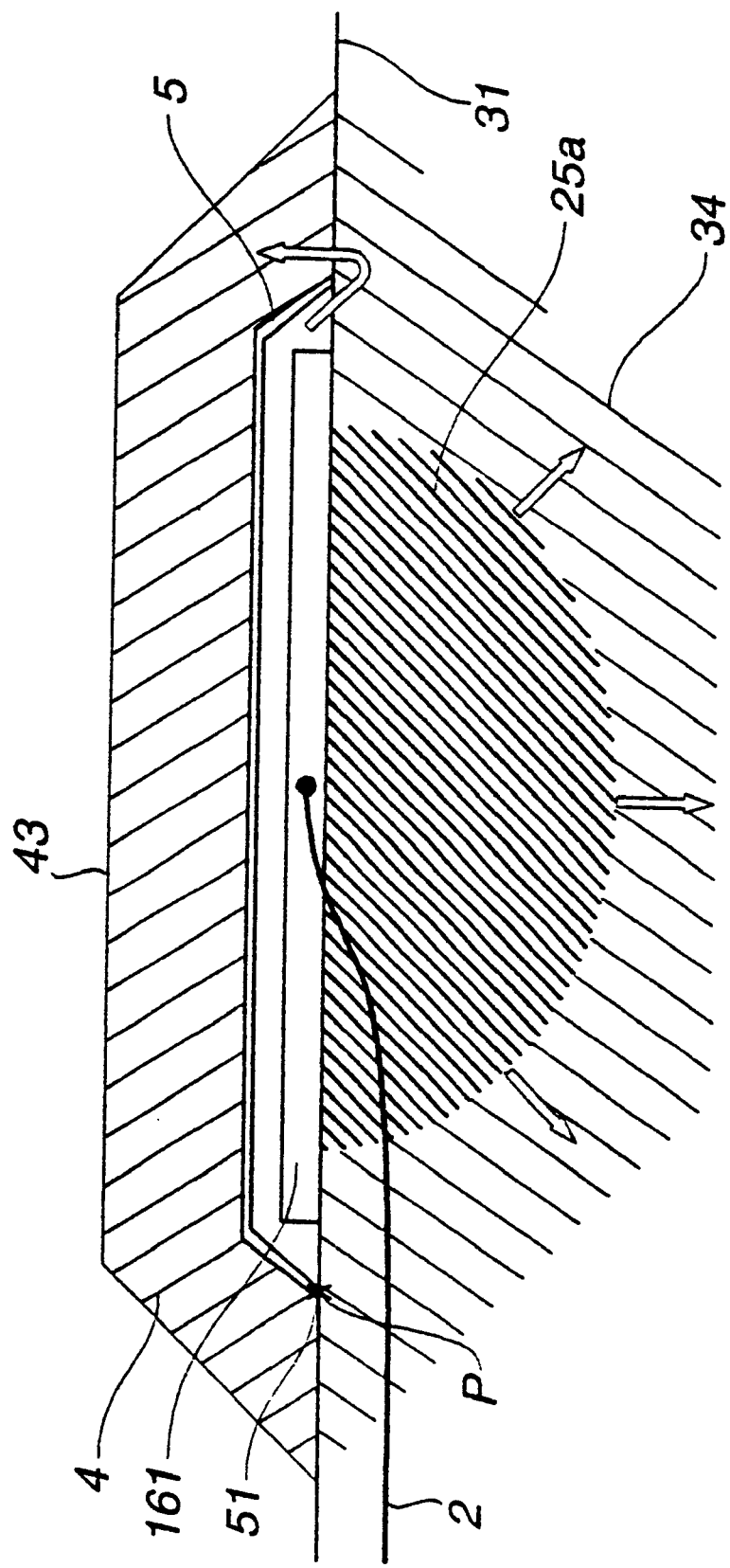
FIG. 15 shows a sea electrode with a layer of a backfill between the subelectrode element and the sea bottom according to an advantageous development of the invention.

In FIG. 15, showing a similar electrode configuration as in FIG. 6A, and where same reference numbers indicates similar parts, another embodiment of the invention is illustrated. A layer 25a, in the figure shown as a semi-spherical body, constituting a backfill and comprising an electronically conductive material, such as a carbonaceous material, for example coke, is embedded in the conducting layer 34 of the sea bottom facing the sea water, in such a way that the backfill is located between the sub-electrode element 161 and the conducting layer 34 of the sea bottom.

The following advantages will be achieved with the invention.

The maximum electrical field strength in the sea water outside a zone below the non-conducting layer can be held below a specified level and harmful environmental effect can thus be avoided.

The arrangement of the electrode as a ring of sub-electrodes, or in a plurality of concentric rings, results in a homogenous current distribution and a better utilization of the material in the electrode body, and by choosing the distance from the electrode body to the edge of the non-conducting layer according to the ground current rating, the electric field strength in the sea water can be reduced to a desired level.

An electrode according to the invention can be designed for a desired current density at its active parts, that is at the electrode body, independently of requirements on a maximum electric field strength in the vicinity of the electrode. This makes it possible to optimize, for a given application, the active parts of the electrode with respect to for instance material, size and form, as the from that optimization resulting electric field strength in the sea water can be reduced to a desired level outside a zone limited by the non-conducting layer, the reduction being controlled by the dimensions of that layer, The use of the non-conducting layer located above the electrode body, together with non-conducting barriers arranged at the sub-electrode elements makes it possible to optimize the electrode with respect to current density on its surface, and independently thereof to make the electric field strength not to exceed a desired value in the sea water in the vicinity of the electrode.

With electrodes equipped with a non-conducting layer and with non-conducting barriers according to the development of the invention, the current density on the surface of the electrode body is homogenized, resulting in a better utilization of the material in the electrode body, and thus in a decreased size of the electrode, as compared to an electrode of conventional design. A considerably less electrode area is required without exceeding specified critical current density on the surface of the electrode and electric field strength in the sea water in the vicinity of the electrode.

For electrodes with a ballast in the form of plates of a solid material according to the invention, the risk of electrode damage for instance by anchors or storms is substantially reduced. The non-conducting layer can then be executed as a coating on the plate, at least on their surfaces facing the electrode body.

Compared to a conventional HVDC sea electrode, a HVDC sea electrode according to the invention and transferring the same current into the sea water, will have a substantially reduced size and exhibit a substantially reduced electrical field strength in the sea water in the vicinity of the electrode.

Barriers also acting as mechanical supports and providing mechanical protection for the sub-electrode elements, in combination with protection provided by the stiff and rigid plates or containers allow the use of fragile or brittle material for the electrode body, which materials could otherwise not be used for self-supporting electrode structures. Typical such electrode body materials are graphite, magnetite and silicon iron. Thus, use of brittle or fragile electrode body materials suited for both anodes and cathodes is made possible with electrodes designed according to the development of the invention, thereby giving the flexibility of polarity reversal of the HVDC transmission.

Typically, sea electrodes according to the invention can be assembled from prefabricated and standardized parts, such as plates, sub-electrode elements and barriers, thereby significantly reducing the costs for the electrode.

What is claimed is:

1. Sea electrode (15) for grounding of a high voltage direct current transmission system, comprising an electrically conducting electrode body (1) for connection to the transmission system and at least one ballast (4) located above the electrode, characterized in that the electrode comprises a layer (5) of an electrically non-conducting material, located above the electrode body and extending over it, so as to influence the maximum electrical field strength not to exceed a desired level at a point (P) at the edge of the non-conducting layer and thereby also, when the sea electrode is embedded in sea water, sea water impregnated matter at the sea bottom, or both in the sea water outside a zone (35) located below the non-conducting layer and in a vertical direction limited by the edge of the non-conducting layer.

2. Sea electrode according to claim 1, characterized in that the layer of non-conducting material is a separate sheet arranged between the electrode body and the ballast.

3. Sea electrode according to claim 1, characterized in that the layer of non-conducting material is a separate sheet embedded in the ballast.

4. Sea electrode according to claim 1, characterized in that the layer of non-conducting material is a separate sheet arranged above the ballast.

5. Sea electrode according to claim 1, characterized in that the ballast comprises at least one plate of a solid material and that the layer (5) of non-conducting material is a coating on a surface of said at least one plate, facing the electrode body.

6. Sea electrode according to claim 1, characterized in that the ballast comprises at least one container and at least a part of the container constitutes the layer of non-conducting material.

7. Sea electrode according to claim 1, wherein the electrode body has at least one sub-electrode element (161, 162, 163) of an elongated shape which is in electric contact with a conducting medium (32), when the sub-electrode element is embedded in it, characterized in that the sea electrode further comprises at least two electrically non-conducting barriers (8, 8a, 8b, 8c), spaced apart along the sub-electrode element, and between which is formed an active part (S) of the surface of the sub-electrode element, said active part is in electric contact with the conducting medium when the sub-electrode element is embedded in it, said barriers having a substantial extension outwards from the active part of the surface of the sub-electrode element, so as to have a substantial extension into the conducting medium when the sub-electrode element is embedded in it, so as to homogenize the current distribution along said active part of the surface of the at least one sub-electrode element.

8. Sea electrode according to claim 7, characterized in that said electrically non-conducting barriers (8) project from the surface of the sub-electrode element at or close to border lines (BL', BL") of said active part of the surface of the sub-electrode element, in directions which, at that location, are substantially perpendicular to said active part of the surface of the sub-electrode element.

9. Sea electrode according to claim 8, wherein the sub-electrode element has the shape of a cylinder, characterized in that at least one of the barriers has the shape of a plate, projecting from an envelope surface of the sub-electrode element in a direction substantially perpendicular to the longitudinal direction of the at least one sub-electrode element.

10. Sea electrode according to claim 8, wherein the sub-electrode element has the shape of a bent elongated body with a given radius of curvature and a corresponding center of curvature, characterized in that at least one of the barriers has the shape of a plate, projecting from the active surface in a direction substantially parallel to the direction of a radius from the center of curvature through the sub-electrode element.

11. Sea electrode according to claim 8, wherein the sub-electrode element has a flat shape, characterized in that at least one of the barriers has the shape of a plate, projecting from the sub-electrode element.

12. Sea electrode according to claim 7, characterized in that the at least two non-conducting barriers also act as a support for the sub-electrode element.

13. Sea electrode according to claim 1, wherein the electrode body comprises at least one sub-electrode element, characterized in that the ballast comprises a cavity (4a) in which the at least one sub-electrode element is located.

14. Sea electrode according to claim 1, characterized in that the ballast comprises side walls (16) which at least partly surround the electrode body and that the non-conducting layer is located by said side walls.

15. Sea electrode according to claim 1, characterized in that the electrode body has the shape of at least one closed ring (151).

16. Sea electrode according to claim 1, characterized in that it comprises a backfill (25a), comprising an electronically conductive material, embedded in the sea bottom in such a way that the backfill is located between the sub-electrode element (161) and the conducting layer (34) of the sea bottom facing the sea water.

17. Sea electrode according to claim 1, characterized in that the active part of the sub-electrode element is embedded in a backfill (25a, 25b) comprising an electronically conductive material.

18. Sea electrode according to claim 1, wherein the electrode body has at least one sub-electrode element (161, 162, 163) of an elongated shape that is in electric contact with a conducting medium (32) of sea water, sea water impregnated matter at the sea bottom, or both, when the at least one sub-electrode is embedded in it, characterized in that the sea electrode further comprises at least two electrically non-conducting barriers (8, 8a, 8b, 8c), spaced apart along the at least one sub-electrode element and between which is formed an active part (S) of the surface of the sub-electrode element, said active part is in electric contact with the conducting medium when the sub-electrode element is embedded in it, said barriers having a substantial extension outwards from the active part of the surface of the sub-electrode element, so as to have a substantial extension into the conducting medium when the sub-electrode element is embedded in it, so as to homogenize the current distribution along said active part of the surface of the at least one sub-electrode element.

19. Sea electrode according to claim 1, further comprising a backfill (25a) having an electronically conductive carbonaceous material embedded in the sea bottom in such a way that the backfill is located between the sub-electrode element (161) and the conducting layer (34) of the sea bottom facing the sea water.

20. Sea electrode according to claim 1, wherein the active part of the sub-electrode element is embedded in a backfill (25a, 25b) comprising an electronically conductive carbonaceous material.

* * * * *